United States Patent
Li et al.

(10) Patent No.: US 11,445,335 B2
(45) Date of Patent: Sep. 13, 2022

(54) SYSTEMS AND METHODS FOR ENABLING PRIVATE COMMUNICATION WITHIN A USER EQUIPMENT GROUP

(71) Applicants: Xu Li, Nepean (CA); Ngoc Dung Dao, Ottawa (CA); Hang Zhang, Nepean (CA)

(72) Inventors: Xu Li, Nepean (CA); Ngoc Dung Dao, Ottawa (CA); Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 290 days.

(21) Appl. No.: 16/540,877

(22) Filed: Aug. 14, 2019

(65) Prior Publication Data

US 2020/0059761 A1    Feb. 20, 2020

Related U.S. Application Data

(60) Provisional application No. 62/719,443, filed on Aug. 17, 2018.

(51) Int. Cl.
*H04W 48/18* (2009.01)
*H04W 12/37* (2021.01)
(Continued)

(52) U.S. Cl.
CPC ............ *H04W 4/08* (2013.01); *H04L 12/185* (2013.01); *H04L 61/10* (2013.01);
(Continued)

(58) Field of Classification Search
CPC ..... H04W 4/08; H04W 12/033; H04W 12/06; H04W 4/06; H04W 4/02; H04W 4/24;
(Continued)

(56) References Cited

U.S. PATENT DOCUMENTS

2019/0182895 A1* 6/2019 Di Girolamo .... H04W 36/0033
2021/0329460 A1* 10/2021 Liao ........................ H04L 63/20

FOREIGN PATENT DOCUMENTS

| CN | 108270808 A | 7/2018 |
| EP | 3402234 A1 | 11/2018 |

(Continued)

OTHER PUBLICATIONS

Hammad Kabir;Muhammad Hassaan Bin Mohsin;Raimo Kantola; "Implementing a Security Policy Management for 5G Customer Edge Nodes"; NOMS 2020—2020 IEEE/IFIP Network Operations and Management Symposium; Year: 2020; Conference Paper: Publisher: IEEE; pp. 1-10 (Year: 2020).*

(Continued)

*Primary Examiner* — Kendall Dolly
*Assistant Examiner* — Courtney D Fields

(57) ABSTRACT

The present invention provides systems and methods and apparatuses for enabling private communication between user equipments (UEs) in a (LAN) UE group. The UEs in the (LAN) UE group can communicate with each other using IP and/or non-IP type communication services. The communications between these UEs may take place in the form of point to point (e.g. UE to UE) communication or point to multi-point communication (e.g. UE to multiple UEs) as opposed to UE to Data Network (DN) communication.

17 Claims, 13 Drawing Sheets

(51) Int. Cl.
*H04W 12/08* (2021.01)
*H04W 4/08* (2009.01)
*H04M 15/00* (2006.01)
*H04L 12/18* (2006.01)
*H04W 12/06* (2021.01)
*H04L 61/5069* (2022.01)
*H04L 9/40* (2022.01)
*H04L 61/10* (2022.01)
*H04W 12/033* (2021.01)

(52) U.S. Cl.
CPC ...... *H04L 61/2069* (2013.01); *H04L 63/0892* (2013.01); *H04M 15/66* (2013.01); *H04W 12/033* (2021.01); *H04W 12/06* (2013.01)

(58) Field of Classification Search
CPC ............... H04M 15/66; H04M 15/765; H04M 15/7655; H04M 15/77; H04M 15/773; H04L 12/185; H04L 61/2069; H04L 63/0892; H04L 61/10; H04L 12/1407; H04L 61/2007
See application file for complete search history.

(56) References Cited

FOREIGN PATENT DOCUMENTS

| | | | |
|---|---|---|---|
| EP | 3557905 A1 | 10/2019 | |
| WO | 2018035431 A1 | 2/2018 | |
| WO | 2018111029 A1 | 6/2018 | |
| WO | 2018127148 A1 | 7/2018 | |
| WO | 2018131984 A1 | 7/2018 | |
| WO | WO-2020186387 A1 * | 9/2020 | ............ H04W 48/18 |

OTHER PUBLICATIONS

"3rd Generation Partnership Project; Technical Specification Group Services and System Aspects; System Architecture for the 5G System; Stage 2"; 3GPP TS 23.501 V15.2.0 (Jun. 2018).

"3rd Generation Partnership Project; Technical Specification Group Services and System Aspects; Procedures for the 5G System; Stage 2"; 3GPP TS 23.502 V15.2.0 (Jun. 2018).

Huawei et al.,"Solution for KI#4 and KI#5: Basic architecture for supporting dynamic 5G LAN-type service and 5GLAN communication",3GPP TSG-SA WG2 Meeting #128bis S2-188340(revision of S2-xxxx),Sophia Antipolis, France, Aug. 20-Aug. 24, 2018,total 3 pages.

SA WG2 Meeting #128-BIS,S2-187743,Solution for support of 5G LAN-type service and 5GLAN communication,20 Aug. 24, 2018, Sophia Antipolis, France,total 4 pages.

SA WG2 Meeting #128-bis,S2-187937,Solution for how to support 5G Lan group communication,vivo,Aug. 20-24, 2018, Sophia Antipolis, France,total 6 pages.

3GPP TS 23.502 V15.2.0:"3rd Generation Partnership Project; Technical Specification Group Services and System Aspects;Procedures for the 5G System;Stage 2(Release 15)",Jun. 2018,total 308 pages.

Huawei, HiSilicon, TS 23.502: Update to PDU session establishment procedure and PDU session establishment authenticationandauthorization via the NEF. SA WG2 Meeting #122, 26 Jun. 30, 2017, San Jose Del Cabo, Mexico, S2-174436, 11 pages.

Huawei, Update to AF influence on traffic routing. 3GPP TSG-SA WG2 Meeting #125, Gothenburg, Sweden, Jan. 22 Jan. 26, 2018, S2-180480, 6 pages.

* cited by examiner

SYSTEMS AND METHODS FOR ENABLING PRIVATE COMMUNICATION WITHIN A USER EQUIPMENT GROUP

CROSS-REFERENCE TO RELATED APPLICATIONS

This application claims the benefit and priority from U.S. Provisional Patent Application No. 62/719,443 filed Aug. 17, 2018, the contents of which are incorporated herein by reference in their entirety.

FIELD OF THE INVENTION

The present invention pertains to the field of network communications, and in particular to methods for enabling private communication within a user equipment (UE) group.

BACKGROUND

In 5GS (5G System), there are communication services provided for connecting a UE (User Equipment) to a DN (Data Network). For example, a PDU (Packet Data Unit) Session can be established between the UE and the DN for the UE to send and receive data. In order for two UEs to communicate with each other conventional systems establish a session for each EU to communicate with a DN, which bridges the two sessions to allow for such UE to UE communication. Accordingly, two PDU Sessions are established respectively for the two UEs without coordination and the data/traffic routing between the two PDU Sessions rely on the transport service provided by the DN that is out of the control of the 5GS.

Therefore there is a need for a method and apparatus for flexible and scalable architecture model that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods to enable a communication service that supports efficient communication between UEs in a UE group (which can be a LAN UE group). In some embodiments the traffic routing is optimized across PDU Sessions. In some embodiments a group management function manages the UE group.

In accordance with an aspect of the present invention, there is provided a method for group communication, the method executed by a group management function, the method including receiving a request relating to a user equipment (UE) group; and sending notification messages to the members of the group as to one of: creation, modification or removal of the group. In some embodiments, the notification messages include service restrictions as to availability of a group communication service associated with the group. In some embodiments, the service restrictions include at least one of: time based restrictions; and location based restrictions. In some embodiments, the method further includes performing at least one of authentication and authorization in response to a request for a data session from a member of the group. In some embodiments, authorization is performed based on the service restrictions. In some embodiments, the request includes one or more of: information identifying a LAN UE Group; the IDs of individual UE(s); the ID of a subgroup for identifying a set of UE(s); a multicast address of a UE Group; and other information as described. In some embodiments, the request is an authorized request received from a Network Exposure Function. In some embodiments, the request is from an application function and wherein sending notification messages to the members of the group includes sending messages to the UEs of the group. In some embodiments, the request is from a UE and wherein sending notification messages to the members of the group includes sending messages to an application function. In some embodiments, the request is from a UE and wherein sending notification messages to the members of the group includes sending messages to the other UEs of the group. In some embodiments, the request is received from an access management function for a request originating with a UE, and the method further includes sending a request for group session management to an enhanced session management function. In some such embodiments, the enhanced session management function is enhance with group functionality, and sending a group session management request to an enhanced session management function includes sending information about one of: the creation of the group; the modification of the group; the removal of the group; a request for a group data session. In some embodiments, the method further includes allocating a multicast address to the group. In some such embodiments, allocating a multicast address to the group includes communication with an address resolution function configured with group functionality.

Another aspect provides a method of allocating a multicast address to a group of user equipment, the method executed by an address resolution function, the method including: receiving UE group membership information from a group management function; receiving user plane function information from a session management function; and providing address information to user plane functions for a group data session.

Another aspect provides an Address Resolution Function (ARF) configured to perform one or more of: requesting UE group membership information from a group management function; receiving UE group membership information from a group management function; store/update PDU Session Anchor information for a PDU session associated with a UG group; and notifying user plane functions of address information and tunnel information for the PDU session for the UE group.

Another aspect provides aspects include a Path Management Function for managing the user plane of a group data session. Another aspect provides User plane functions as described. Another aspect provides an enhanced Session Management Function (SMF) as described. Another aspect provides a Group Management Function (GMF) as described. Another aspect provides for methods performed by network functions as described.

Another aspect of the disclosure provides a method for enabling group user equipment (UE) communication, the method performed by a session management function (SMF) of a core network. The method includes receiving a request for a protocol data unit (PDU) session. The method further includes the SMF requesting authorization and authentication from a data network (DN) authentication, authorization, and accounting (AAA) server. The method further includes the SMF receiving information associated with an allowed UE group from the DN-AAA server. The method further includes the SMF requesting PCC rules for the PDU session, the request including information about the PDU session, including the information associated with the allowed UE group. The method further includes the SMF receiving the PCC rules associated with the allowed UE group; and establishing the user plane path for the PDU session according to the PCC rules.

Another aspect of the disclosure provides a network node configured as a session management function. The SMF includes a processor coupled to non-transient machine readable memory for configuring the network node for: receiving a request for a protocol data unit (PDU) session; requesting authorization and authentication from a data network (DN) authentication, authorization, and accounting (AAA) server; receiving information associated with an allowed UE group from the DN-AAA server; requesting PCC rules for the PDU session, the request including information about the PDU session, including the information associated with the allowed UE group; receiving the PCC rules associated with the allowed UE group; and establishing the user plane path for the PDU session according to the PCC rules.

Another aspect of the disclosure provides a system for supporting user equipment (UE) group communication. Such a system includes a session management function; a data network (DN) authentication, authorization, and accounting (AAA) server; and a policy control function (PCF). In such a system, the SMF is configured for: receiving a request for a protocol data unit (PDU) session; requesting authorization and authentication from the DN AAA server; receiving information associated with an allowed UE group from the DN-AAA server; requesting PCC rules for the PDU session, the request including information about the PDU session, including the information associated with the allowed UE group; receiving the PCC rules associated with the allowed UE group; and establishing the user plane path for the PDU session according to the PCC rules. In such a system, the DN-AAA server is configured for sending the allowed UE group to the SMF in response to the request for authorization and authentication. In such a system, the PCF is configured for sending the PCC rules associated with the allowed UE group in response to the request for the PCC rules.

BRIEF DESCRIPTION OF THE FIGURES

Further features and advantages of the present invention will become apparent from the following detailed description, taken in combination with the appended drawings, in which.

It will be noted that throughout the appended drawings, like features may be identified by like reference numerals.

DETAILED DESCRIPTION

Definitions

Figure 1:
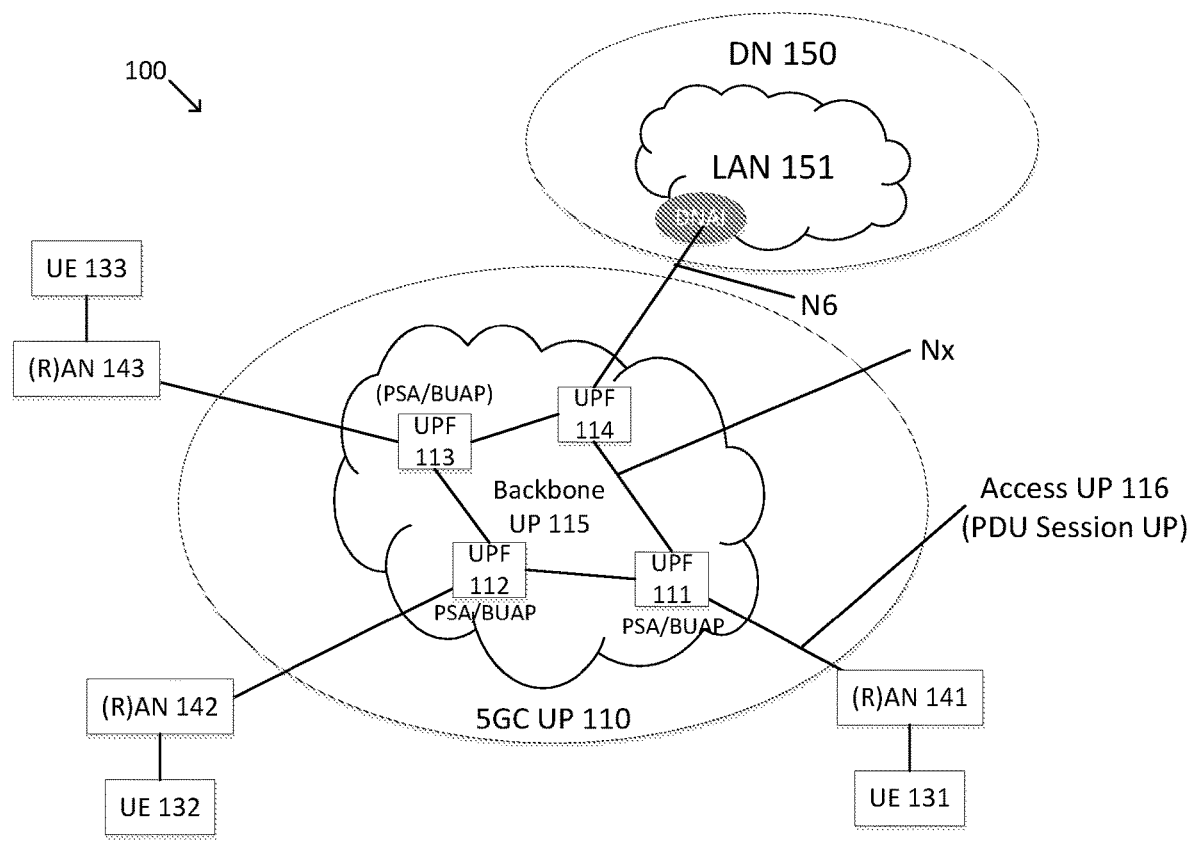
FIG. 1 is a schematic diagram illustrating a User Plane (UP) architecture of 5GLAN communication framework in accordance with embodiments of the present invention.

The term "network function (NF)" refers to any physical or virtual network functions (PNFs, VNFs) that can perform UP (user plane), CP (control plane), and/or MP (management plane) functionalities.

The term "LAN-type communication" refers to communication between UEs or a group of UEs using IP and/or non-IP type communications. One example of LAN-type communication service is 5G LAN-type service.

The term "LAN UE group" refers to a restricted set of UEs which can communicate with each other by using LAN-type communication service. One example of the LAN UE group is 5GLAN group.

Unless defined otherwise, all technical and scientific terms used herein have the same meaning as commonly understood by one of ordinary skill in the art to which this invention belongs.

The present invention presents systems and methods to enable a communication service that supports efficient communication between UEs in a UE group, where the traffic routing, including UP (user plane) path selection, is optimized across PDU Sessions. In some embodiments, the UE group can be a LAN UE group. Examples in this specification will be discussed with respect to LAN UE groups, but other UE groups can be supported. Another example may include UE groups for mobility handling, where a lead UE represents the entire group and performs mobility management (e.g. local tracking) with the network. A further example may be a UE group for supporting group communication in RAN. The LAN-type communication may take place in the form of point to point (e.g. UE to UE) communication or point to multi-point communication (e.g. UE to multiple UEs) as opposed to UE to DN communication.

According to embodiments of the present invention, a LAN UE group may be managed (e.g. created, modified, and removed) based on request from an AF (Application Function) or request from a UE. A UE that belongs to a LAN UE group (e.g. 5GLAN group) can access the LAN-type communication service (e.g. 5G LAN-type service) corresponding to that LAN UE group.

In some embodiments, LAN UE groups (e.g. 5GLAN groups) may be isolated from each other. In such cases, communication between UEs belonging to different LAN UE groups (e.g. different 5GLAN Groups) may not be supported or allowed.

According to embodiments, a UE can access the LAN-type communication service by establishing a PDU Session. During establishment of the PDU Session, the UE is authenticated and/or authorized for accessing the LAN-type communication service. The LAN-type communication service supports communication within a LAN UE group by coordinating PDU Sessions of the UEs (e.g. traffic routing between PDU sessions takes place within the 5GS).

The 5GS may offer the LAN-type communication service by establishing a UP composed of one UPF (User Plane Function) or multiple interconnected UPFs. When the UEs within the LAN UE group need to communicate with a physical LAN or subnet (e.g. IP subnet) in the DN for some data services, the UP of the LAN-type communication service can be viewed as a virtual extension of the physical LAN or subnet in the DN.

According to embodiments, the UP of a LAN-type communication service includes two parts, the Access UP and the Backbone UP. The Access UP includes the UP paths of PDU Sessions that access the LAN-type communication service. The Backbone UP includes UPFs and Nx connections connecting the UPFs. Nx connections are the connections that interconnects UPFs. Various protocols, e.g. GTP-U, IP, Ethernet, UDP, TCP, or any tunnelling protocol, can be run between the UPFs to implement Nx connections. These UPFs and the Nx connections between them bridge the UP paths in the Access UP. They may also bridge the UP paths in the Access UP with the physical LAN or subnet, if it exists, in the DN. The Nx connections in the Backbone UP are managed by a CN (core network), for example 5GC (5G Core Network). Traffic routing over Nx in the Backbone UP is configured at the LAN-type communication service level (e.g. per hop). In some embodiments, the UPF(s) in the Backbone UP may operate as a router or a network switch and may also treat the UP path of the PDU Session as the cable connecting the UE to one port/interface on the router or switch. The topology of the Backbone UP may have a tree structure, a ring structure, a mesh structure, or a line structure, and may be implementation specific.

According to embodiments, the Access UP and the Backbone UP intersect at UPFs. Here, the UPFs may be viewed as PSA (PDU Session Anchor) UPFs from the access UP point of view and viewed as BUAP (Backbone UP Access Point) UPFs from the backbone UP point of view. Moreover, the UP of a LAN-type communication service may be viewed or considered as a virtual network instantiated on top of the network.

FIG. 1 illustrates an example UP architecture 100 of 5GLAN communication framework in accordance with embodiments of the present invention. The connections between the network elements in FIG. 1 are not necessarily limited to direct physical connections. Each connection may be a logical connection. In some embodiments of the present invention, each connection may be wireless communicative connection.

Referring to FIG. 1, the 5GC UP 110 is a UP of a 5G LAN-type service and is communicatively connected to the UEs in a LAN UE group and to the DN 150. The 5GC UP 110 includes the Backbone UP 115 comprising one or more UPFs (e.g. the UPFs 111, 112, 113 and 114). According to embodiments, the topology of Backbone UP is implementation specific and the topology of the Backbone UP 115 shown in FIG. 1 is just an example. Each UPF in the Backbone UP 115 is communicatively connected to its neighbour UPFs over Nx connections. The Nx connections in the Backbone UP 115 may be managed by the 5GC. The traffic routing over Nx connections in the Backbone UP 115 can be configured at the LAN-type communication service level (e.g. 5G LAN-type service level) for example, per hop.

Some of the UPFs (e.g. UPF 114) in the Backbone UP 115 may be communicatively coupled to the (physical) LAN 151 in the DN 150 over an interface, e.g. the N6 interface. The LAN 151 may use the DNAI (DN Access Identifier) to identify the location of the UE that requests access to the LAN 151.

The Access UP 116 and the Backbone UP 115 intersect at UPFs (e.g. UPFs 111, 112 and 113). These UPFs may be viewed as PSA UPFs from the access UP point of view and viewed as BUAP UPFs from the backbone UP point of view. The UPFs 111, 112 and 113 are communicatively coupled to the (R)ANs ((Radio) Access Networks) 141, 142 and 143, respectively over the Access UP 116 (e.g. corresponding PDU Session UPs that comprises the Access UP 116). Each of the (R)ANs 141, 142 and 143 are communicatively connecting the corresponding UE and the UPF (e.g. connecting the UPFs 111, 112 and 113 to the UE 131, 132 and 133, respectively) over the Access UP 116, as shown in FIG. 1. According to embodiments, the UPFs 111, 112 and 113 may operate as a router or a network switch and treats the UP path of the PDU session as the intermediary network element (e.g. optical cable) connecting the UE to the interface on each of the UE 131, 132 and 133.

According to embodiments of the present invention, in order to enable LAN-type communication service such as 5G LAN-type service, the CN (e.g. 5GC) may be enhanced with one or more network functions/functionalities in the CP. The one or more network functions that may enhance the 5GC are Group Management Function (GMF), Path Management Function (PMF) and Address Resolution Function (ARF). GMF is responsible for LAN UE group (e.g. 5GLAN group) management, including one or more of creating, modifying and removing a LAN UE group (e.g. 5GLAN group) and responding to queries about information of a LAN UE group (e.g. 5GLAN group) or about UE(s) belonging to the LAN UE group. The LAN UE group management is performed according to authorized request from the UE or the AF. The GMF is also responsible for authentication/authorization of UEs for accessing LAN-type communication service (e.g. 5G LAN-type service). PMF is responsible for managing the UP (e.g. selecting UPF and reselecting UPF) to support LAN-type communication (e.g. 5GLAN communication) within a LAN UE group (e.g. 5GLAN group) and, possibly in some embodiments, to ensure desired isolation of traffic between multiple LAN UE groups. During the UP management, the PMF takes into account UE location information, and DNAI information (if available) to make UP management decision. ARF is responsible for maintaining the association between BUAP(s) and UE network addresses and provide information of BUAP(s)

associated to a UE network address upon request. According to embodiments, GMF, PMF and ARF are all network functions (NFs) or network functionalities. Each of these NFs can be implemented as an independent network function or can be implemented by an existing network function. Any of these NFs can be implemented together within a single network function. It should be appreciated in the discussion below with respect to the call flows and related methods, individual network functions are illustrated and inter-function messaging will be discussed as examples. However, as discussed, in some embodiments these functions can be combined with other functions. In which case the call flow signaling between functions can be considered intra-function signaling.

In addition, according to embodiment, the CN (e.g. 5GC) may be also enhanced by SMF (Session Management Function) functionality enhancements. An enhanced SMF may perform LAN UE group authentication (e.g. 5GLAN group authentication) and authorization with GMF during PDU Session establishment and/or modification procedure; configure packet handling rules (e.g. packet routing & forwarding rules, packet marking rules) in the UPF to support LAN-type communication (e.g. 5GLAN communication).

Figure 2:
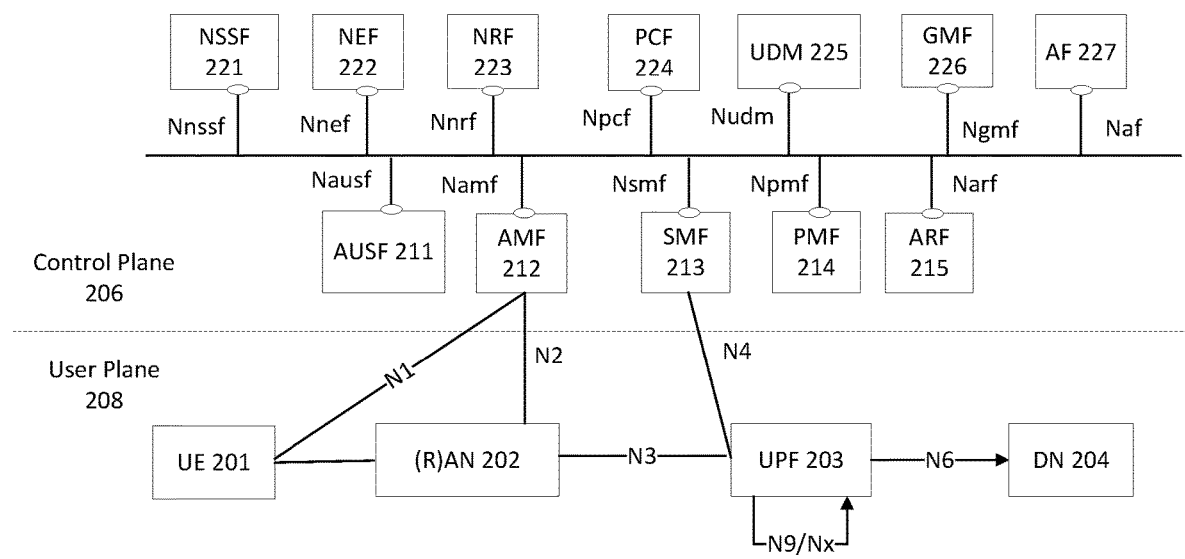
FIG. 2 is a schematic diagram illustrating a service-based view of an example of an enhanced 5GS architecture in accordance with embodiments of the present invention.

FIG. 2 illustrates an example of enhanced 5GS architecture in a non-roaming scenario in accordance with embodiments of the present invention. FIG. 2 depicts logical connections between network nodes and functions, and its illustrated connections should not be interpreted as direct physical connection. The UE 201 forms a radio access network connection with a (Radio) Access Network node (R)AN 202, which is connected to a UPF 203 over a network interface such as an N3 interface. The UPF 203 connects to the DN 204 over a network interface such as an N6 interface. The DN 204 may be a data network used to provide an operator service, or it may be outside the scope of the standardization of the 3GPP (Third Generation Partnership Project), such as the Internet, a network used to provide third party service. In some embodiments, the DN 204 may represent an Edge Computing network or resource, such as Mobile Edge Computing (MEC) network.

The UE 201 also connects to the AMF 212. The AMF 212 is responsible for authentication and authorization of access requests, as well as Mobility management functions. The AMF 212 may perform other roles and functions as defined by the 3GPP Technical Specification (TS) 23.501. In a service based view, AMF 212 can communicate with other functions through a service based interface denoted as Namf. The SMF 213 is a network function that is responsible for configuring UP paths for PDU Sessions; in some embodiments, it may be responsible for the allocation and management of IP (Internet Protocol) addresses that are assigned to a UE; in some embodiments, it may further be responsible for the selection or reselection of the UPF 203 or a particular instance of the UPF 203 for traffic associated with a particular session of UE 201. The SMF 213 may configure packet handling rules (e.g. packet routing & forwarding rules, packet marking rules) in the UPF 203 to support LAN-type communication (e.g. 5GLAN communication). Furthermore, the SMF 213 may also perform LAN UE group authentication (e.g. 5GLAN group authentication) and authorization with the GMF 226 during PDU Session establishment/modification procedure. The SMF 213 may communicate with other functions, in a service based view, through a service based interface denoted as Nsmf. The Authentication Server Function (AUSF) 211 provides authentication services to other network functions over a service based Nausf interface. The PMF 214 is a network function responsible for managing the UP (e.g. selecting UPF and reselecting UPF) to support LAN-type communication (e.g. 5GLAN communication) within a LAN UE group (e.g. 5GLAN group) and, possibly in some embodiments, to ensure desired isolation of traffic between different LAN UE groups. During the UP management, the PMF 214 takes into account location information of the UE 201, and DNAI information (if available) to make UP management decision. The PMF 214 may communicate with other functions, in a service based view, through a service based interface denoted as Npmf. The ARF 215 is a network function responsible for maintaining the association between BUAP(s) and UE network addresses and provides information of BUAP(s) associated to a UE network address upon request. The ARF 215 may communicate with other functions, in a service based view, through a service based interface denoted as Narf. Each of the PMF 214 and the ARF 215 can be implemented as an independent network function or can be implemented by an existing network function. It is also possible to implement the two network functionalities together within a single network function.

The Network Exposure Function (NEF) 222 can be deployed in the network to allow servers, functions and other entities such as those outside a trusted domain to have exposure to services and capabilities within the network. In one such example, the NEF 222 can act much like a proxy between an application server outside the illustrated network and network functions such as the Policy Control Function (PCF) 224, the SMF 213 and the AMF 212, so that the external application server can provide information that may be of use in the setup of the parameters associated with a data session. The NEF 222 can communicate with other network functions through a service based Nnef network interface. The NEF 222 may also have an interface to non-3GPP functions. A Network Repository Function (NRF) 223 provides network service discovery functionality. The NRF 223 may be specific to the Public Land Mobility Network (PLMN) or network operator, with which it is associated. The service discovery functionality can allow network functions and UEs connected to the network to determine where and how to access existing network functions, and may present the service based interface Nnrf. PCF 224 communicates with other network functions over a service based Npcf interface, and can be used to provide policy and rules to other network functions, including those within the CP. Enforcement and application of the policies and rules is not necessarily the responsibility of the PCF 224, and is instead typically the responsibility of the functions to which the PCF 224 transmits the policy. In one such example the PCF 224 may transmit policy associated with session management to the SMF 213. This may be used to allow for a unified policy framework with which network behavior can be governed. A Unified Data Management Function (UDM) 225 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 225 may be implemented as a UDM Front End (UDM-FE) and a User Data Repository (UDR). The PCF 224 may be associated with the UDM 225 because it may be involved with requesting and providing subscription policy information to the UDR, but it should be understood that typically the PCF 224 and the UDM 225 may be independent functions. The PCF may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of Authentication Credential Processing, User Identification handling, Access Authorization, Registration/ Mobility management, subscription management, and Short Message Service (SMS) management. The UDR is typically responsible for storing data provided by the UDM-FE. The stored data is typically associated with policy profile information (which may be provided by PCF 224) that governs the access rights to the stored data. In some embodiments, the UDR may store policy data, as well as user subscription data which may include any or all of subscription identifiers, security credentials, access and mobility related subscription data and session related data. The GMF 226 is a network function responsible for management of LAN UE groups (e.g. management of 5GLAN groups), including one or more of creating, modifying and removing a LAN UE group (e.g. 5GLAN group) and responding to queries about information of a LAN UE group (e.g. 5GLAN group) or about UE(s) belonging to the LAN UE group. The LAN UE group management (e.g. 5GLAN group management) is performed according to authorized request from the UE (e.g. UE 201) or the AF (e.g. AF 227). The GMF is also responsible for authentication/authorization of UEs for accessing LAN-type communication service (e.g. 5G LAN-type service). The GMF 226 may be implemented as an independent network function or can be implemented by other network function. The GMF 226 may communicate with other network functions, in a service based view, through a service based interface denoted as Ngmf. Application Function (AF) 227 represents the non-data plane (also referred to as the non-user plane) functionality of an application deployed within a network operator domain and within a 3GPP compliant network. The AF 227 interacts with other core network functions through a service based Naf interface, and may access network capability exposure information, as well as provide application information for use in decisions such as traffic routing. The AF 227 can also interact with functions such as the PCF 224 to provide application specific input into policy and policy enforcement decisions. It should be understood that in many situations the AF 227 may not provide network services to other NFs, and instead is often viewed as a consumer or user of services provided by other NFs. An application outside the 3GPP network, can perform many of the same functions as AF 227 through the use of NEF 222.

UE 201 communicates with network functions that are in the User Plane (UP) 206, and the Control Plane (CP) 208. The UPF 203 is a part of the CN UP 206 (DN 204 being outside the 5GCN). (R)AN 202 may be considered as a part of a User Plane, but because it is not strictly a part of the CN, it is not considered to be a part of the CN UP 206. AMF 212, SMF 213, PMF 214, ARF 215, AUSF 211, NEF 222, NRF 223, PCF 224, UDM 225 and GMF 226 are functions that reside within the CN CP 208, and are often referred to as Control Plane Functions. AF 227 may communicate with other functions within CN CP 208 (either directly or indirectly through the NEF 222), but is typically not considered to be a part of the CN CP 208.

Those skilled in the art will appreciate that there may be a plurality of UPFs connected in series between the (R)AN 202 and the DN 204, multiple data sessions to different DNs can be accommodated through the use of multiple UPFs in parallel.

Figure 3A:
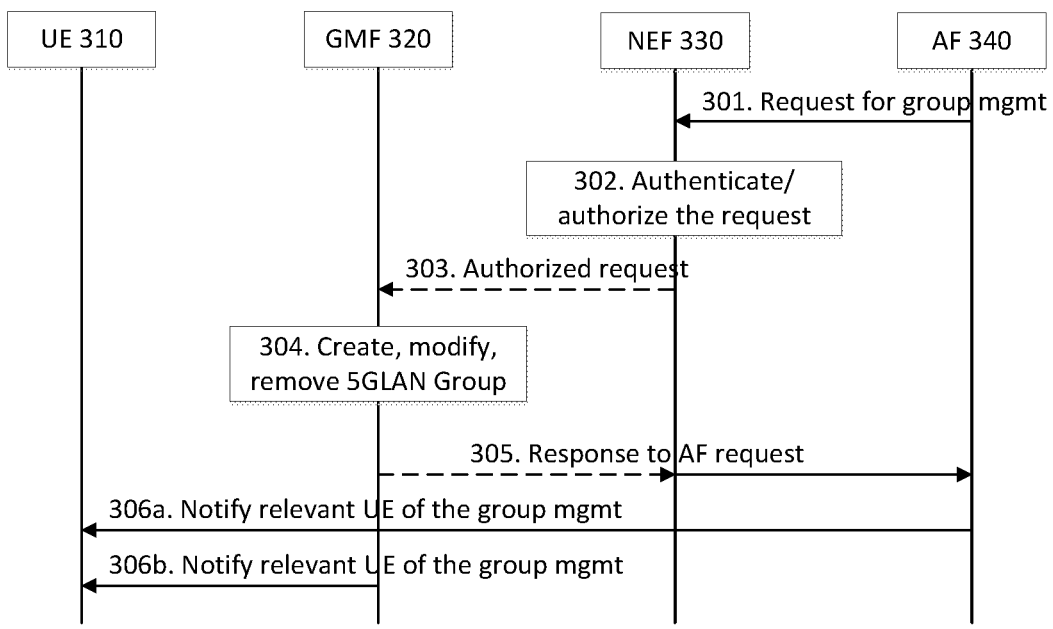
FIG. 3A is a flow diagram illustrating a procedure for managing a LAN UE group (e.g. 5GLAN group) based on a request from the Application Function (AF) in accordance with embodiments of the present invention.

FIG. 3A illustrates a procedure for managing a LAN UE group (e.g. 5GLAN group) based on a request from the AF, in accordance with embodiments of the present invention. LAN UE group management includes creating, modifying, or removing a LAN UE group and querying information about a LAN UE group or a member UE within the LAN UE group.

In some embodiments, a UE can make the request for group management instead of the AF. In such embodiments, the UE may perform the procedures illustrated in FIG. 3A by acting as AF. The UE may interact with the NEF via the CP (e.g. through the AMF) or via the UP (e.g. via a PDU Session connecting the UE to the NEF). The UE may also interact with the GMF without involving the NEF, via the CP (e.g. via the AMF) or via the UP (e.g. via a PDU Session connecting the UE to the GMF). When the UE interacts with the GMF via the AMF, the AMF may authenticate and/or authorize the UE for the group management requested by the UE. To do this, the AMF may interact with the UDM to obtain subscription information related to the UE, and use the subscription information obtained from the UDM to authentication and/or authorize the UE. When the UE interacts with the GMF via the UP, the GMF is responsible for authenticating and/or authorizing the UE for the group management requested by the UE. To do this, the GMF may request the UE to provide identity information and determines whether the request group management is allowed nor not.

In some embodiments, the AF 340 sends a request to the GMF 320 to manage a LAN UE group (e.g. 5GLAN group) for supporting LAN-type communication (e.g. 5GLAN communication) between UEs within the LAN UE group. In some embodiments, as illustrated in FIG. 3A the AF 340 sends the request 301 to the NEF 330, which performs authentication/authorization 302 for the request before forwarding the authorized request 303 to the GMF 320. The request 301 may be sent for the purpose of creating, modifying or removing a LAN UE group, or for the purpose of querying information of UE(s) belong to a LAN UE group. The request may include any of: AF-service-ID (which may correspond to a service contract and can be used for authorizing the AF request, and/or which may map to any of DNN and S-NSSAI), UE identifier (e.g., the identifier such as SUPI or GPSI of the UE sending the request, when the UE makes the request and performs the procedure of sending the request), DNN, S-NSSAI, and identifier of the LAN UE group (e.g. in the form of External group identifier (ID) or Internal group ID). If the LAN UE group is a subgroup of a parent LAN UE group, the request may include the information of the parent LAN UE group (e.g. the identifier of the parent LAN UE group).

When the AF 340's request is to create or modify a LAN UE group, the request may further include any of the following information: information of UEs belonging to the LAN UE group; information of the LAN-type communication service corresponding to the LAN UE group; information of the authentication method for UEs in the LAN UE group; and/or information for securing the LAN-type communication within the LAN UE group.

Having regard to information of UEs belonging to the LAN UE group, the information of UEs may include one or more of UE IDs (e.g. GPSI, SUPI), UE's network address (e.g. IP address or MAC address) and security credentials (e.g. security key, user name and password). Here, the UEs belonging to the LAN UE group may include UEs which would be added into or removed from the LAN UE group. Thus, the information of UEs in the LAN UE group may include information of the UEs which will be added into or removed from the LAN UE group.

Regarding the information of the LAN-type communication service (e.g. 5GLAN communication service) which corresponds to the LAN UE group, the information may include any of the following:

- type of addresses supported such as Ethernet-type or IP-type, which means the communication service supports IP traffic or Ethernet traffic;
- allowed VLAN ID(s) for Ethernet type;
- allowed MAC address(es) for Ethernet type; and/or
- IP address range/list for IP type.

The information of the LAN-type communication service may further indicate time-based service restrictions (e.g. in the form of time interval or duration) and/or location-based service restrictions (e.g. in the form of location area). Here, the time based restrictions implies that the service is available, valid and/or allowed for access during the specified time (e.g. time interval or duration). Similarly, the location based restrictions implies the service is available, valid and/or allowed for access only by UEs belonging to the LAN UE group (e.g. 5GLAN group) and located in the specified location area. It should be appreciated that the term "allowed" UE group implies the UE is authorized to communicate as part of the UE group is authorized.

VLAN ID identifies network traffic of a group of network devices (e.g. LAN UE group). The VLAN ID can be included in packet header and used by network elements in the user plane (e.g. UPF, switch, router) to forward network traffic so that the traffic is forwarded only to the network devices within that group. VLAN ID and use of VLAN ID is described in the IEEE 802.1Q standard.

Regarding information for securing the LAN-type communication within the LAN UE group, an example of information for securing the LAN-type communication may include a security key to be used by the UEs in the LAN UE group for protecting the confidentiality of the traffic.

In addition to above, if the AF 340's request is to create a LAN UE group, the request may further include a multicast indication. The indication demonstrates that the LAN UE group is a multicast group and the LAN-type communication (e.g. 5GLAN communication) within the LAN UE group will be multicasting communication. The indication may also include a multicast address (such as multicast IP address) associated to the LAN UE group. The multicast message sent from each UE within the LAN UE group will be destined to this multicast address.

When the AF 340's request is to query information of an existing LAN UE group or information of UE(s) within an existing LAN UE group, the request may indicate whom (e.g. the entire LAN UE group, or a particular set of UE(s)) is being queried. The request may include the ID of the LAN UE group for identifying the LAN UE group. The request may include the IDs of individual UE(s), or the ID of a subgroup for identifying a set of UE(s)). The information being queried may include any of the aforementioned information with respect to creating or modifying a LAN UE group and the multicast address associated to the LAN UE group. The multicast address associated to the LAN UE group may be provided by the AF 340 or allocated by the network (e.g. by the GMF during creation of the LAN UE group, as described with reference to FIG. 3A)

At step 302, the NEF 330 may authenticate and/or authorize the request. This step may be optionally performed, for example when the AF 340 is in located in the trust domain or when the GMF 320 is in charge of the authentication and/or authorization. The NEF 330 may identify whether to perform the authentication and/or authorization according to local configuration or pre-configured local policy, which for example may be provided by the OAM or by the operator.

At step 303, the NEF 330 sends the request (e.g. the request authorized in step 302) to the GMF 320. Before sending it to the GMF 320, the NEF 330 may perform information mapping with the information in the request (e.g. map to GPSI to IMSI, map External group ID to Internal group ID).

At step 304, the GMF 320 creates, updates, or deletes the context or profile for the LAN UE group according to the request. Alternatively, step 304 includes the GMF 320 identifying the information being queried from the context or profile of the LAN UE group, according to the request. If the request in step 301 is a request for group creation, the GMF 320 may allocate a group ID for the created LAN UE group. If the request in step 301 is a request for group creation and includes a multicast indication, the GMF 320 may allocate the multicast address to the created LAN UE group. If the request in step 301 indicates that the communication service corresponding to the LAN UE group supports IP traffic, the multicast address may be in the form of IP address. If the request indicates that the communication service corresponding to the LAN UE group supports Ethernet traffic, the multicast address may be in the form of MAC/Ethernet address. In some embodiments, the multicast address allocation happens only when the request includes a multicast indication. The multicast address allocation is optional when a multicast address is provided (e.g. as part of the multicast indication) in the request in step 301.

At step 304, according to embodiments, the GMF 320 may generate or update a security key for UEs in the LAN UE group to perform communication with each other. This may happen if the request sent from the AF 340 in step 301 does not include such a security key. The security key generated or updated by the GMF 320 is part of the context or profile of the LAN UE group.

The GMF 320 may store the group context or profile (including the multicast address associated to the LAN UE group) locally or in a separate network function such as UDR or UDM or UDSF (Unstructured Data Storage Function). When the context (or profile) is stored in a separate network function, the GMF 320 may interact with that network function, for the purpose of creating, modifying or deleting the context or identifying the queried information from the context, by sending a request to the network function. When sending the request to the network function (e.g. the UDR), the request may include the group context to be created or modified or an indication of the group context to be deleted or the information being queried. The network function (e.g., the UDR) which receives the request may respond to the GMF 320 to confirm that requested action has been taken and/or to provide the query result.

At step 305, the GMF 320 responds to the AF 340, acknowledging the acceptance of the request. The response may be sent via the NEF 330 if the request in step 301 is received via the NEF 330; otherwise, the response is sent directly to the AF 340. If the request in step 301 is a query request, the response includes the query result. If a multicast address is allocated to the LAN UE group in step 304, the response may include the multicast address. If a security key is generated or updated for UEs in the LAN UE group to perform communication with each other in step 304, the response may include the generated or updated security key.

When step 305 is completed, at step 306a or step 306b, the UE 310 related to the group management operation may be optionally notified about the group management operation requested by the AF 340 in step 301. The notification may include any information that is associated with the LAN UE group (some information described in the request in step 301). The information in the notification may include, without limitation, any of the following: whether the UE is added in the group, whether the UE is removed from the group, the UE's network address, network addresses of other UEs in the LAN UE group, location based service restrictions, time-based service restrictions, information for securing the LAN-type communication within the LAN UE group, etc. The notification may also include the multicast address of the LAN UE group, which may have been allocated to the LAN UE group in step 304 or have been provided in the request in step 301. The notification may further include a security key for UEs in the LAN UE group to perform communication with each other. The security key may be provided by the AF 340 or be generated or updated by the GMF 320. As mentioned above, step 306a and step 306b are optional.

There are two ways of sending the notification to the UE 310. The first way, step 306a, is sending the notification from the AF 340 to the UE 310 (e.g. through the application triggering mechanism described in 3GPP TS23.502, clause 4.13.2) where the notification is in the message delivered to the UE. The other way, step 306b, is sending the notification from the GMF 320 to the UE 310 (e.g. through a procedure described in FIG. 3B) where the notification can be viewed as part of UE configuration update.

Figure 3B:
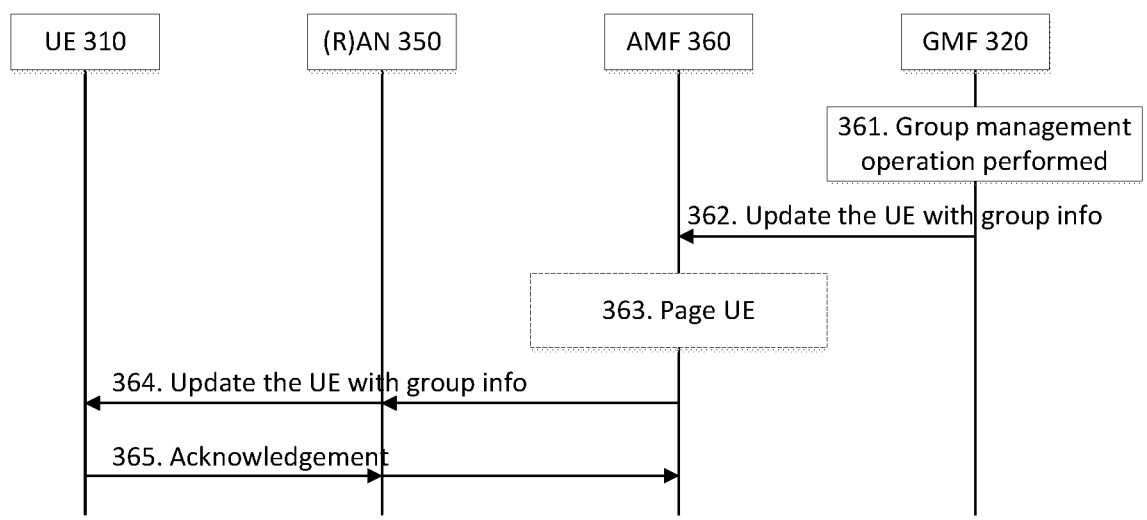
FIG. 3B is a flow diagram illustrating a procedure where the Group Management Function (GMF) notifies the UE about any group management operation related to the UE in accordance with embodiments of the present invention.

FIG. 3B illustrates a procedure where the GMF notifies the UE about any group management operation related to the UE, in accordance with embodiments of the preset invention. Steps illustrated in FIG. 3B may be implemented or viewed as a UE configuration update for LAN UE group management information. These steps may be performed by the GMF 320 after it performs the group management operation as shown in FIG. 3A or when the UE 310 registers to the network (e.g. during a registration procedure). In this procedure, the GMF 320 may send information about the group management operation to the AMF 360 serving the UE 310. Then, the AMF 360 sends the information to the UE 310 through a NAS message or a NAS procedure. If the UE 310 is not in CM-Connected state, the AMF 360 may need to page the UE 310 before sending the information to the UE 310.

Referring to FIG. 3B, at step 361, the GMF 320 performs group management operation toward a LAN UE group. Step 361 is similar to step 304 in FIG. 3A.

At step 362, the GMF 320 sends information related to the group management information to the AMF 360 serving the UE 310. The information may include those described in step 306 of FIG. 3A. In some embodiments, the GMF 320 may interact with the UDM to discover the serving AMF 360 of the UE 310, which is not shown in the figure. This may be done, for example, by the GMF 320 providing the UE ID such as GPSI or SUPI to the UDM, which then returns the network address or ID of the AMF 360 serving the UE 310 to the GMF 320.

At step 363, the AMF 360 pages the UE 310 if the UE 310 is not in CM-Connected state or if the UE 310 is in CM-Idle state.

At step 364, The AMF 360 sends the information received in step 362 to the UE 310 using a NAS message. Then, the UE 310 may initiate, when needed, accessing to the LAN-type communication service (e.g. 5G LAN-type service) of the LAN UE group, which the UE 310 belongs to, with respect to or using the information, for example service restrictions (e.g. location based service restriction and time-based service restriction). In the NAS message, the AMF 360 may indicate to the UE 310 whether a response or acknowledgement is required for the message. The AMF 360 may send the NAS message via the (R)AN 350 to the UE 310.

At step 365, the UE 310 responds to the AMF 360, acknowledging the receipting of the information, if the UE 310's response is required as illustrated above in step 364. The response is sent via the (R)AN 350 to the AMF 360.

Figure 4:
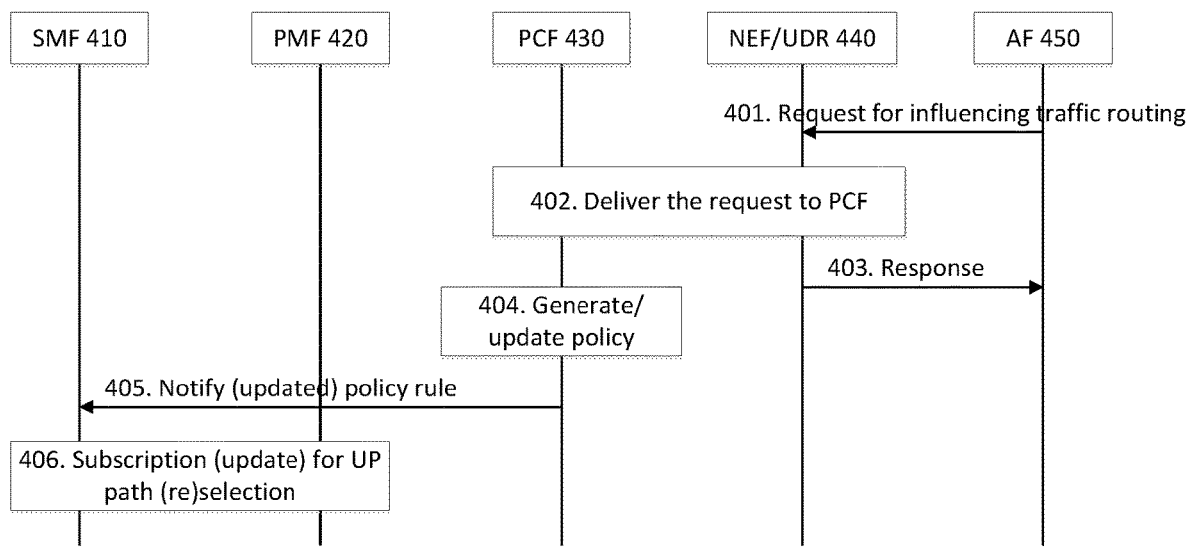
FIG. 4 is a flow diagram illustrating a procedure of enhanced AF influence for jointly managing UP paths for communication within the LAN UE group in accordance with embodiments of the present invention.

According to embodiments, after the AF requests the GMF to create a LAN UE group, for example as described in FIG. 3A, the AF may provide policy requirements to the PCF for jointly managing the UP paths for communications within the LAN UE group. This joint management, can be realized in some embodiments by enhancing the AF influence feature. In such an enhancement, the AF may influence the network's UP path management decision such that the UP paths of the PDU Sessions identified in the AF request are jointly managed for the LAN communication service as shown in FIG. 4. The original AF influence feature (without the enhancement described herein) is illustrated in the 3GPP TS 23.501, V15.2.0, clause 5.6.7.

When the UE performs the above group management procedure by acting as AF, the UE may also perform the enhanced AF influence procedure by acting as AF. The UE may interact with the NEF via the control plane (e.g. through the AMF) or via the user plane (e.g. via a PDU Session connecting the UE to the NEF). The UE may also interact with the PCF without involving the NEF, via the control plane (e.g. via the AMF) or via the user plane (e.g. via a PDU Session connecting the UE to the PCF).

In some embodiments, the GMF, on behalf of the actual AF or the UE, may perform the enhanced AF influence procedure by acting as AF and provide such policy requirements to the PCF, for example when the LAN UE group is created. The policy requirements (in the form of AF request) are generated by the GMF based on the group context information (e.g. location-based service restrictions, time-based service restrictions, etc.); the group context information is described earlier herein. FIG. 4 illustrates a procedure of enhanced AF influence for jointly managing UP paths for communication within the LAN UE group in accordance with embodiments of the present invention. As mentioned, in some embodiments, the UE or the GMF may perform the procedure by acting as AF.

Referring to FIG. 4, at step 401, the AF 450 requests to influence traffic routing via the NEF 440. In this embodiment, the AF 450's request identifies the traffic related to the communication within the LAN UE group and the PDU Sessions related to the traffic. The AF 450's request may further indicate that these identified PDU Sessions are correlated for joint UP path management. In other words, the UP paths of those PDU Sessions can be (re)selected jointly, for the identified traffic. The result of such joint UP path management may be that, for example, all or part of the UP paths share a common PSA. The AF 450's request may be a request for modifying or deleting the AF 450's previous request(s), and the modifying or deleting may cause the influence on traffic routing from the AF 450's previous request(s) to be changed or removed.

Then, the NEF 440, at step 402, delivers or transports the AF 450's request to the PCF 430 directly or via UDR, similar to the procedure described in the 3GPP TS 23.501, V15.2.0, clause 6.3.7.2. At step 403, the NEF 440 responds to the AF 450 to acknowledge the receipt of the AF 450's request.

At step 404, the PCF 430 generates or updates Policy and Charging Control (PCC) rules according to the AF 450's request received in step 402. At step 405, the PCF 430 notifies the SMF 410 of the generated or updated PCC rules if the SMF 410 has subscribed to receive the PCC rules.

Then, the SMF 410 selects a PMF for subscription to UP path (re)selection decision for a PDU Session. The PDU session may be related to the PCC rules received in step 405. This step is optional if the SMF 410 has already selected a PSF for the PDU Session or if the SMF 410 decides not to use PMF (e.g. according to local configuration or pre-configured local policy)

At step 406, the SMF 410 subscribes to receive UP path (re)selection decision for the PDU Session from the PMF 420 if it has not subscribed yet, or updates the existing subscription if the PCC rules received in step 405 cause change(s) in subscription, or removes the existing subscription if the PCC rules received in step 405 implies the need of removal.

Figure 5A:
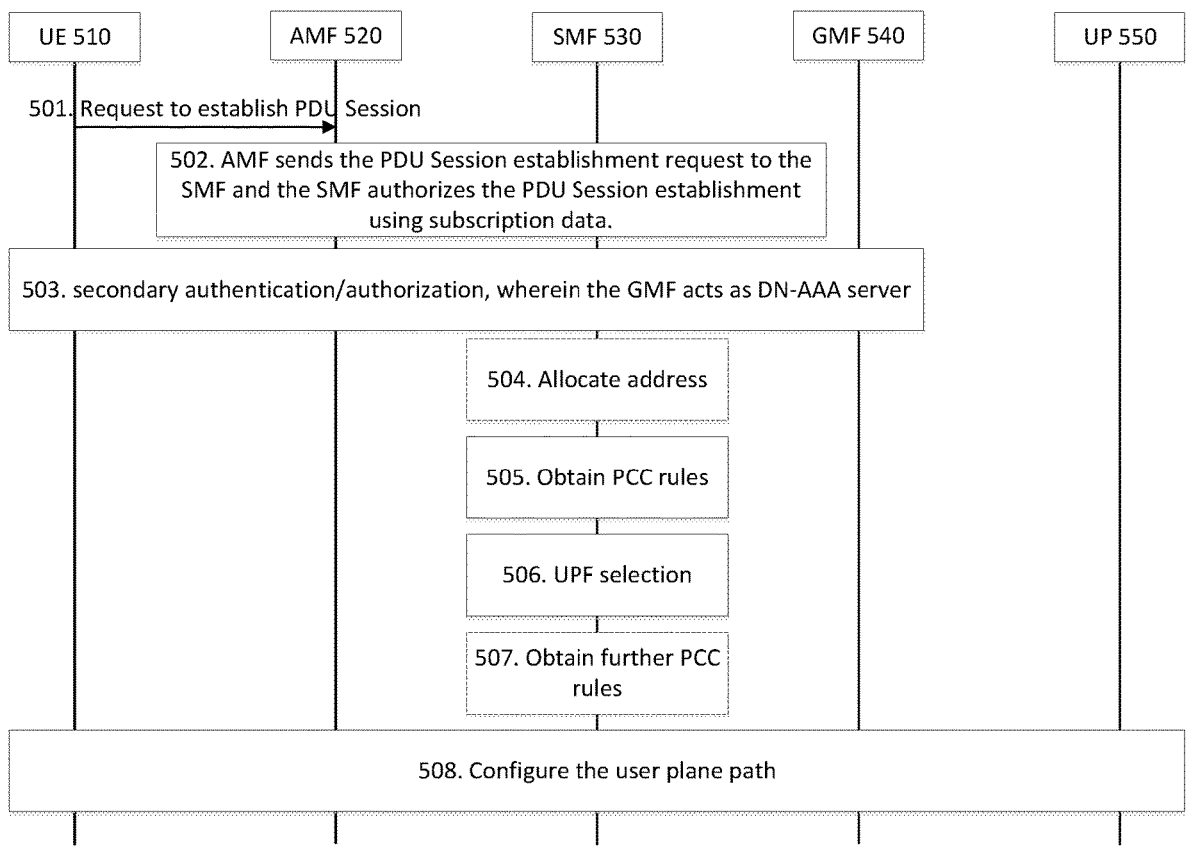
FIG. 5A is a flow diagram illustrating a procedure of PDU Session establishment for joining group communication in accordance with embodiments of the present invention.

A LAN-type communication (e.g. 5G LAN-type) service may be associated with a DN, which may be an actual DN or virtual DN. The number of LAN-type communication services associated to the same DN may be limited, and the limit may be configured by the operator. A UE accesses a LAN-type communication service by establishing a PDU Session targeting the DN associated to the LAN-type communication service. During establishment of the PDU Session, the LAN UE group(s) (e.g. 5GLAN group(s)), whose members the UE is allowed to communicate with using the established PDU Session, is identified. In this case, the UE belongs to the identified allowed LAN UE group(s). The UE can then use the established PDU Session to perform communication with other UEs in an allowed LAN UE group, which corresponds to the UE accessing the LAN-type communication service. Identifying the LAN UE group may be done through secondary authentication/authorization performed with the GMF. FIG. 5A illustrates a procedure of PDU Session establishment for joining group communication (e.g. LAN-type communication) in accordance with embodiments of the present invention. It should be appreciated that while a RAN node is not shown in FIG. 5A, a RAN node would be involved with UE communications with a 3GPP network.

Referring to FIG. 5A, at step 501, the UE 510 sends a request to the AMF 520 for establishing a PDU Session. Step 501 is similar to step 1 of FIG. 4.3.2.2.1-1 in the 3GPP TS 23.502 V15.2.0, clause 4.3.2.2. Then, step 502 follows. Step 502 is similar to steps 2 to 5 of FIG. 4.3.2.2.1-1 in the 3GPP TS 23.502 V15.2.0, clause 4.3.2.2. For example, the AMF 520 sends the PDU Session establishment request to the SMF 530. The SMF 530 obtains session management related subscription data from a network function, for example the UDM, using the information in the PDU Session establishment request received from the AMF 520. The subscription data may correspond to SUPI, DNN, S-NSSAI and PLMN ID. It should be appreciated that the UDM may obtain the data from the UDR.

The SMF authorizes the PDU Session establishment according to or using the subscription data.

At step 503, the SMF 530 according to local configuration or policies (e.g. DN policies) initiates secondary authentication/authorization with the GMF 540. According to embodiments, the GMF 540 may then act as the DN-AAA (DN-Authentication, Authorization, and Accounting) server and performs the secondary authentication/authorization with the UE for the PDU Session. The procedure of secondary authentication/authorization by an DN-AAA server during PDU Session establishment is described in 3GPP TS 23.502, clause 4.3.2.3, which can be extended for PDU sessions for a UE group. As should be apparent to a skilled worker in the art, a DN-AAA server may be located in the control plane of the 3GPP network, or outside of the 3GPP network (e.g. inside the DN), and provides authentication, authorization, and optionally accounting functionality for a DN service.

Step 503 is similar to step 6 of FIG. 4.3.2.2.1-1 in the 3GPP TS 23.502 V15.2.0, clause 4.3.2.2, but extended for PDU sessions for a UE group. In this step, the SMF 530 may provide the location information of the UE 510 to the GMF 540, and the GMF 540 may authorize the establishment of the PDU Session for the UE 510 according to the UE location information received from the SMF 530.

Also at step 503, the GMF 540 sends the authentication/authorization result/data to the SMF 530. The authentication/authorization result/data may include information associated with the allowed LAN UE group(s) (e.g. LAN UE group ID(s)) for the established PDU Session. An allowed LAN UE group implies that the UE 510 is allowed to access, using the established PDU Session, the LAN-type communication service (e.g. 5G LAN-type service) corresponding to the LAN UE group. In other words, UE 510 can join or participate in or perform the LAN-type communication (e.g. 5GLAN communication) within the LAN UE group using the established PDU Session. The GMF 540 may identify the allowed LAN UE groups according to the UE location information received from the SMF 530 and the location-based service restrictions (e.g. as described in paragraphs for FIG. 3) associated to the LAN UE groups. In some embodiments, the authentication/authorization result/data may further include information indicating that the allowed LAN UE group(s) is a multicast or broadcast group, i.e. the LAN-type communication service corresponding to the LAN UE group is a multicast or broadcast service. The information may further include security credentials (e.g. security key such as a group key) associated with the allowed LAN UE group. The security credentials can be used by the UE to encrypt or decrypt multicast or broadcast traffic when accessing the multicast or broadcast service corresponding to the LAN UE group using the established PDU Session. In this case, the SMF may provide the security credentials to the UE, e.g. when indicating to the UE that the PDU Session establishment request has been accepted or that the PDU Session has been established, as described elsewhere herein. The information indicating that the allowed LAN UE group(s) is a multicast or broadcast group may be separate from or integrated within the information associated with the allowed LAN UE group described above. Further, while a single LAN group is discussed, it should be appreciated that multiple LAN groups are supported.

According to embodiments, the authentication/authorization result/data may further include information of service restrictions associated to each allowed LAN UE group (e.g. location based service restrictions, time-based service restriction). Service restrictions are further described above (e.g. the paragraphs describing FIG. 3A). The SMF 530 may evaluate the service restrictions and also may release the PDU Session based upon the evaluation result. For example, the SMF 530 may release or deactivate the PDU Session when the UE 510 moves out a location area specified in the location based restriction or when the current time falls outside a time interval specified in the time-based service restriction (e.g. passes a specified duration). On the other hand, the SMF 530 may activate the PDU Session when the UE 510 moves in a location area specified in the location based restriction or when the current time falls inside a time interval (within a specified duration) specified in the time-based service restriction.

According to embodiments, the authentication/authorization result/data may further include a network address allocated to the UE 510 for an allowed LAN UE group. If the context or profile of the LAN UE group indicates a network address associated with the UE (e.g. in the case that the request for group create or modification includes the network address for the UE, as described in step 301 of FIG. 3A), the GMF 540 includes that network address in the authentication/authorization result/data as the network address allocated to the UE 510. This is a static network address scenario, where the UE is always allocated the same network address for performing communication with other UEs in this particular LAN UE group. If the context or profile of the LAN UE group indicates a network address associated with the UE (e.g. in the case that the request for group create or modification does not include a network address for the UE, as described in step 301 of FIG. 3A) and if the context or profile of the LAN UE group include the list/range of network addresses associated with the LAN UE group, the GMF 540 may allocate a network address for the UE from the list/range of network addresses associated with the LAN UE group. Otherwise, to allocate the network address, the GMF 540 may interact with a separate network entity (e.g. DHCP server) that manages the network addresses associated with the LAN UE group. The GMF 540 may request that network entity to allocate a network address for the UE by sends information of the LAN UE group (e.g. group ID) to that network entity. In response, that network entity sends to the GMF 540 a network address allocated to the UE.

At step 504, the SMF 530 allocates a network address to the UE 510 according to the information of allowed LAN UE group(s) received from the GMF 540. In this step, the SMF 530 may interact with a separate network entity for the address allocation. Step 504 is optional if a network address has been already allocated to the UE 510 in step 503.

At step 505, the SMF 530 obtains PCC rules from the PCF. This step is similar to step 7 of FIG. 4.3.2.2.1-1 in the 3GPP TS 23.502 V15.2.0, clause 4.3.2.2 but extended for PDU sessions for a UE group. In this step, the SMF 530 may provide the information (e.g. group ID) of LAN UE group(s) received from the GMF 540 in step 503 to the PCF and the PCF sends PCC rules related to the allowed LAN UE group(s) to the SMF. In some embodiments, the PCC rules may indicate that the allowed LAN UE group is a multicast or broadcast group, (e.g., the LAN-type communication service corresponding to the allowed LAN UE group is a multicast or broadcast service).

Figure 6:
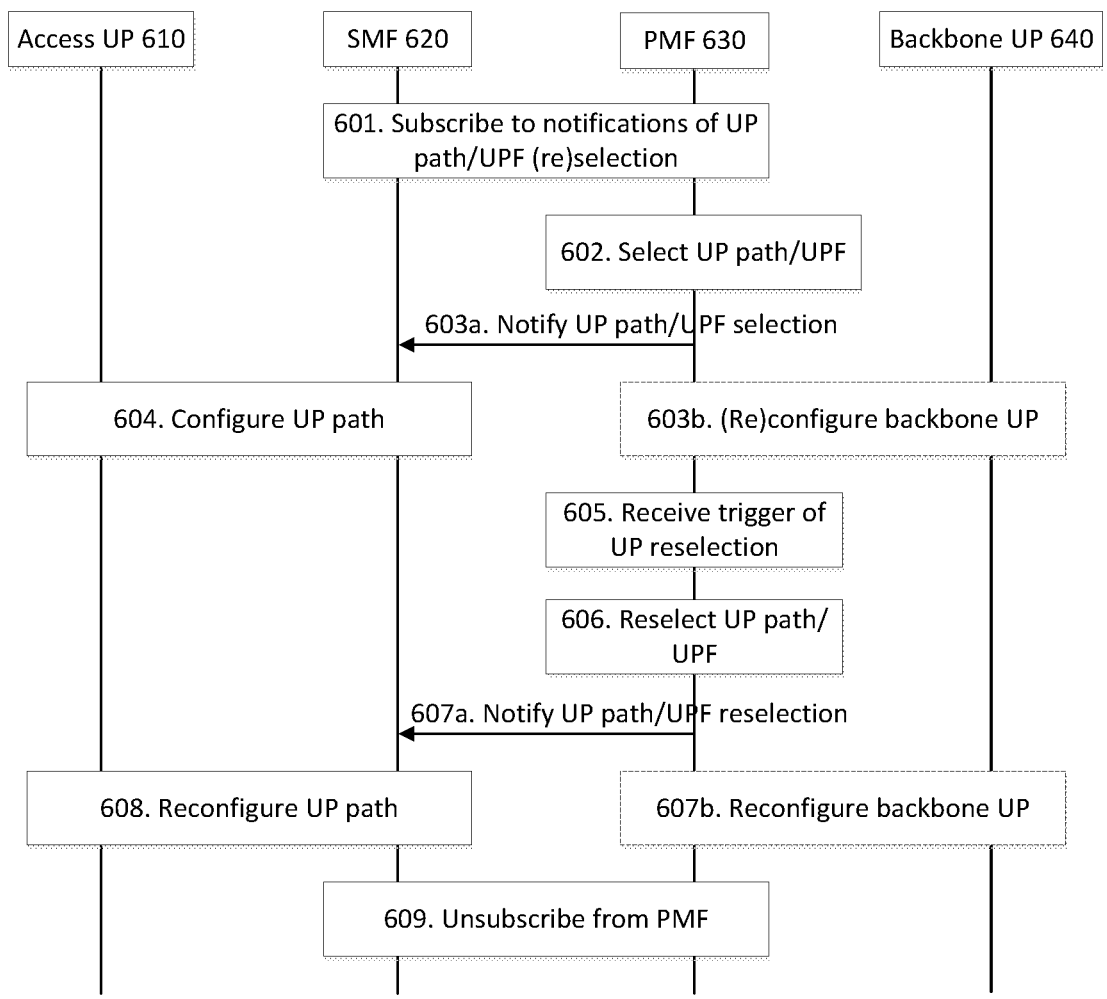
FIG. 6 is a flow diagram illustrating a procedure of UP path (re)selection by Path Management Function (PMF) in accordance with embodiments of the present invention.

At step 506, the SMF 530 performs UPF selection for the PDU Session. Step 506 may be similar to steps 601, 602, 603*a* of FIG. 6 illustrated below. The SMF 530 may interact with a PMF for performing UPF selection, as illustrated in FIG. 6.

Then, the next steps are Steps 507 and 508. Step 507 is similar to step 9 of FIG. 4.3.2.2.1-1 in the 3GPP TS 23.502 V15.2.0, clause 4.3.2.2 and is optional.

Figure 5B:
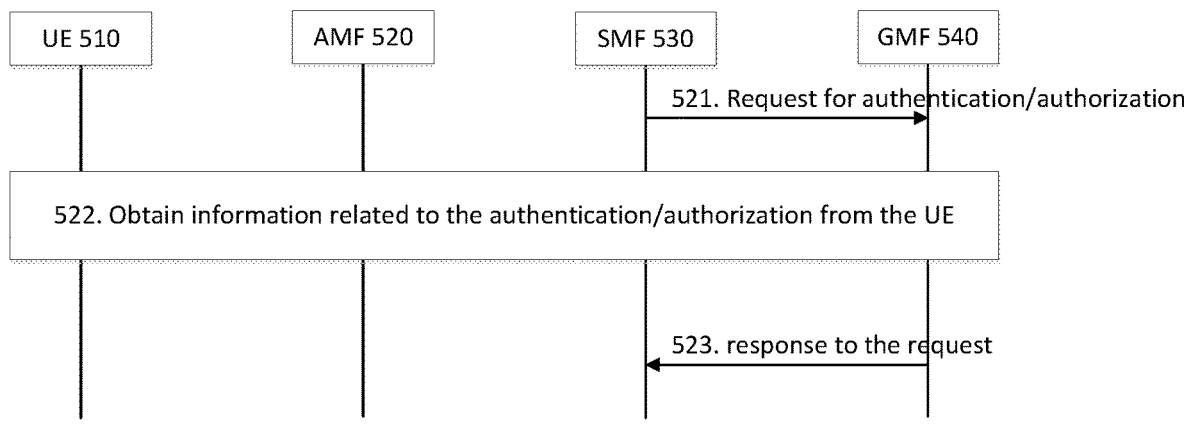
FIG. 5B illustrates more details for the secondary authorization/authentication step 503, according to an embodiment.

Step 508 is similar to steps 10 to 18 of FIG. 4.3.2.2.1-1, 3GPP TS 23.502 V15.2.0, clause 4.3.2.2., but extended for PDU sessions for the UE group. At step 508, the SMF 530 configures the UP path and UP resources for the PDU Session. The SMF 530 sends to the UE a network address allocated to the UE 510 in this step, and may also indicate to the UE the LAN-type communication that UE can perform using the network address e.g. by using the LAN UE group identifier corresponding to the LAN-type communication, which is received from the GMF 540 in step 503. In some embodiments, when configuring the UP path the SMF may create a UP tunnel for the PDU Session. Alternatively the SMF may associate an existing UP tunnel to the PDU session, as part of the UP path, for supporting the LAN-type communication service. In some embodiments, the existing UP tunnel can be associated with a PDU Session of a different UE in the LAN UE group identified by the LAN UE group ID. In some embodiments, when the LAN UE group is a multicast or broadcast group (e.g. as indicated by the authentication/authorization result/data in step 503 or by the PCC rules in step 505), the SMF may provide to the RAN node information indicating that the PDU session is to support multicast or broadcast communication. The information may further include the LAN UE group ID (e.g., an allowed LAN UE group ID received by the SMF in step 503). The RAN node may then, according to the information, allocate multicast or broadcast resource for, or associate existing multicast or broadcast resource to the PDU session. For example, the RAN node may create a multicast or broadcast bearer for the PDU Session. As an alternative example, the RAN node may associate an existing multicast or broadcast bearer to the PDU Session. The existing multicast or broadcast bearer can be shared by a different UE in the LAN UE group identified by the LAN UE group ID for joining or performing the LAN-type communication, if the different UE is served by the same RAN node. In some embodiments, the SMF may provide session management related information to the RAN node to help the RAN node to optimize RAN parameters for the PDU Session. In some embodiments, the SMF may subscribe to mobility event notification from the AMF. The SMF may indicate to the UE that the PDU Session establishment request is accepted (or that the PDU Session has been established), as part of step 502. For example, the SMF may send to the UE an PDU Session establishment accept message via the AMF, and may send to the UE the IP address allocated to UE for the PDU Session (e.g. as part of the PDU Session establishment accept message sent to the UE). If the authentication/authorization result/data received in step 503 includes security credentials (e.g. a group security key) associated to the allowed LAN UE group as described above, the SMF may provide the security credentials to the UE. The SMF may provide the security credentials to the UE when indicating to the UE that the PDU Session establishment request is accepted, e.g. by including the security credentials in the PDU Session establishment accept message sent to the UE. The UE may use the security credentials received from the SMF to encrypt and/or decrypt multicast or broadcast traffic when accessing the multicast or broadcast service corresponding to the LAN UE group using the established PDU Session. FIG. 5B illustrates more details for the secondary authorization/authentication step 503, according to an embodiment. In such an embodiment, the GMF 540 can be configured to act as DN-AAA server (e.g. include DN-AAA server functionality). In other embodiments, a separate network function can act in this capacity. In step 521, the SMF sends a request for authentication/authorization to the GMF, the request including the authentication/authorization information of the UE to the GMF. For example, request 521 may be sent if the UE provides the authentication/authorization information, which is corresponding to a DN-specific identity, during the establishment of the PDU Session. Request 521 may also be sent if the SMF determines that authentication/authorization of the PDU Session Establishment is required based on the SMF policy associated with the DN. In some embodiments, both conditions are required to trigger the SMF sending the request. In some embodiments, other conditions can trigger the request. The SMF may include the UE identity information, e.g. GPSI, in the request. In some embodiments, the SMF may further include location information of the UE in the request. The location information may be in the form of cell ID or RAN node ID (i.e. ID of the cell or RAN node currently serving the UE), tracking area ID, geographic position, geographic zone ID, etc. The location information may be provided by the AMF to the SMF when the AMF sends the PDU Session establishment request to the SMF (e.g. in the step 502 of FIG. 5A, as part of the PDU Session establishment request). The request 521 can be sent from the SMF to the GMF via the user plane (e.g. a UPF), for example when the GMF is located in the DN. In other embodiments, the request 521, the request can be sent via control plane signaling without involving the user plane (e.g. directly or via the NEF), for example when the GMF is located in the control plane.

Upon receiving the request 521, the GMF 540 (or a DN-AAA server component) will authenticate/authorize 522 the PDU Session Establishment. As part of step 522, the DN-AAA server may interact with the UE, e.g. via SMF, AMF and RAN (which is not shown in the figure), to obtain additional information related to or needed for the authentication/authorization. When the GMF 540 authorizes the PDU Session Establishment via response 523. This response 523 may include DN Authorization Data for the established PDU Session to the SMF. The GMF 540 may include an allowed UE group ID in the DN authorization data sent to the SMF. In some networks, external group IDs are used outside the network by external entities whereas internal group IDs are used inside the network by network components. In such embodiments, if the allowed UE group ID is in the form an external group ID), the SMF 530, after receiving the data 523, may map the allowed group ID to an internal group ID). During the mapping, the SMF may interact with the UDM to obtain the internal group ID (e.g. send the external group ID to the UDM and receive the mapped internal group ID from the UDM). The SMF 530 may provide the allowed UE group ID to the PCF to get PCC rules related to the corresponding UE group, e.g. as described in the step 505 of FIG. 5A. In some embodiments, in the DN authorization data 523 sent to the SMF, the GMF 540 may further include information indicating that the allowed LAN UE group(s) is a multicast or broadcast group, i.e. the LAN-type communication service corresponding to the LAN UE group is a multicast or broadcast service. The information may comprise security credentials (e.g. security key such as a group key) associated with the allowed LAN UE group. The security credentials can be used by the UE to encrypt and/or decrypt multicast or broadcast traffic when accessing the multicast or broadcast service corresponding to the LAN UE group using the established PDU Session.

Figure 5C:
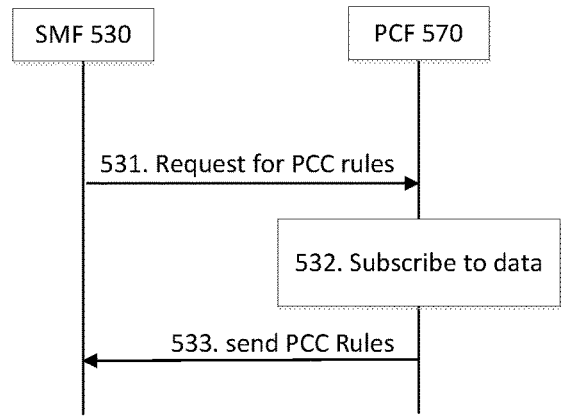
FIG. 5C illustrates more details for the obtain PCC rules step 505, according to an embodiment.

FIG. 5C illustrates more details for the obtain PCC rules step 505, according to an embodiment. The SMF requests the PCC rules related to the PDU Session, by sending a request 531 to the PCF 570. The SMF may include the UE group ID (e.g. allowed UE group ID received from the GMF, or the corresponding internal group ID) in the request 531 sent to the PCF 570. The SMF 530 may also include UE identity information (e.g. SUPI and/or GPSI), information about the PDU Session (e.g. PDU Session id, PDU Session Type, S-NSSAI, DNN), and user or UE location Information in the request. As shown at step 532, the PCF may subscribe to receive data related to the PDU Session (e.g. data related to the information provided by the SMF request 531, such as SUPI, GPSI, UE group ID, PDU Session ID, S-NSSAI, DNN, user/UE location info) from the UDR, if the PCF has not yet subscribed to such data. The PCF 570 generates PCC rules for the PDU Session based on the data received from the UDR and the information received from the SMF in request 531. The PCF sends the PCC rules to the SMF as step 533.

According to embodiments of the present invention, the UP paths of PDU Sessions accessing/supporting/used for the same LAN-type communication may be managed jointly by the PMF. The PCF generates PCC rules based on the policy requirements from the AF or from the UE or from the GMF (as described for embodiments associated to FIG. 4) and provides the PCC rules to the PMF via SMF. The PCC rules indicate that the PDU Sessions of the LAN UE group are correlated for joint UP path (re)selection for corresponding LAN-type communication. According to the correlation indication, the PMF performs joint UP path (re)selection for the correlated PDU Sessions with respect to the location of individual UEs in the LAN UE group. The PMF provides the UP path (re)selection decision to the serving SMFs of the PDU Sessions. The SMFs (re)configure the UP paths accordingly. FIG. 6 illustrates a procedure of UP path (re)selection by a PMF in accordance with embodiments of the present invention. While the PMF is illustrated as a separate network function in FIG. 6, it should be appreciated that in other embodiments, the PMF may form (e.g, be instantiated as) part of the SMF. In some embodiments, an SMF may be enhanced with PMF functionality, removing the need for the separate PMF.

At step 601, the SMF 620 may be establishing or modifying a PDU Session for a UE to perform communication within a LAN UE group. The SMF 620 subscribes to receive notifications of UP path (re)selection decision for the PDU Session from the PMF 630. For example, the subscription can include the UE group ID for the PDU session, information of the PDU Session (e.g. PDU Session ID), and location information of the UE (e.g. information such as ID of the cell or RAN node serving the UE). In other words, in some embodiments, the SMF 620 may provide the UE group ID, the information of the PDU Session, and the location information of the UE, to the PMF in the subscription request. In some embodiments, the subscription can include policy information related to the PDU Session. The policy information may include information in the PCC rules received from the PCF, e.g. in step 505 of FIG. 5A or in step 405 of FIG. 4. The step 601 of FIG. 6 can be similar to or the same as the step 406 of FIG. 4.

At step 602, the PMF 630 selects UP path for the PDU Session according to the SMF subscription, UPF information, and local configuration. The UP path selection decision may take into account other PDU Sessions that are correlated to this PDU Session (e.g. the PDU Sessions established for other UEs in the LAN UE group to perform communication within the LAN UE group). In this step, the PMF 630 may determine or update the composition (which UPFs belong to the backbone UP 640) and the topological structure (e.g. how those UPFs are interconnected) of the backbone UP 640 for supporting communication within the LAN UE group. The PMF 630 may also determine or update how this PDU Session and other PDU Session(s) correlated to this PDU Session are anchored in the backbone UP 640 (e.g. which of the UPFs in the backbone UP are BUAP/PSA for these PDU Sessions).

At step 603a, the PMF 630 notifies the SMF 620 of the UP path selection decision. Then, at step 603b, the PMF 630 (optionally) configures or reconfigures the backbone UP 640 of the communication service corresponding to the LAN UE group. The PMF 630 may also configure the connection between the UPFs in the backbone UP 640. Step 603b is optional if the backbone UP 640 has already been configured and there is no change to the backbone UP 640 introduced in step 602.

At step 604, the SMF 620 configures the UP path for the PDU Session according to the UP path selection decision received from the PMF 630. This step may happen within step 508 of FIG. 5 during PDU Session establishment.

After the UP path configuration is completed, the PMF 630, at step 605, may receive a trigger for UP path reselection for the PDU Session. The trigger may include any of the followings: (i) an update to the subscription in step 601, received from the SMF 620; (ii) subscription to UP path (re)selection decision is created, modified or removed for a PDU Session that is correlated to this PDU Session; and (iii) other factors such as change in UPF information (e.g UPF load or capacity change, change of connectivity and/or connection quality between UPFs, etc.).

Upon receiving the trigger(s), the PMF 630, at step 606, may reselect UP path for the PDU Session according to the received trigger(s) and the information associated with the trigger(s). The UP path selection decision may take into account other PDU Sessions that are correlated to this PDU Session (e.g. the PDU Sessions established for other UEs in the LAN UE group to perform communication within the LAN UE group). In step 606, the PMF 630 may update the composition (which UPFs belong to the backbone UP 640) and the topological structure (how those UPFs are interconnected) of the backbone UP 640 for supporting communication within the LAN UE group. The PMF 630 may also update how this PDU Session and other PDU Session correlated to this PDU Session are anchored in the backbone UP 640 (e.g. which of the UPFs in the backbone UP 640 are BUAP/PSA for these PDU Sessions).

In step 607a, the PMF 630 notifies the SMF 620 of the UP path reselection decision for the PDU Session. Then, at step 607b, the PMF 630 (optionally) reconfigures the backbone UP 640. In step 607b, the PMF 630 may also (re)configure the connection between the UPFs in the backbone UP 640. Step 607b is optional if there is no change to the backbone UP introduced in step 606.

At step 608, the SMF 620 reconfigures the UP path for the PDU Session according to the UP path reselection decision received from the PMF 630. This step may happen within PDU Session modification procedure.

At step 609, the SMF 620 unsubscribes from the PMF 630 for the PDU Session when the PDU Session is released or when the UP connection of the PDU Session is deactivated. The un-subscription may trigger the PMF 630 to perform UP path reselection for the PDU Sessions correlated to this PDU Session (e.g. the PDU Sessions established for other UEs in the LAN UE group to perform communication within the LAN UE group).

According to embodiments, when a BUAP UPF (referred to as source BUAP) receives UL traffic destined to a network address (e.g. an IP address) from a UP tunnel, it resolves the network address by interacting with the ARF. The network address may be an address allocated to an individual UE or an address allocated to a UE group such as LAN UE group (e.g. a multicast address). As a result of the network address resolution, the source BUAP may obtain the information about the destination BUAP(s) (referred to as target BUAP(s)) corresponding to the network address. The information about the destination BUAP(s) may be, for example, the network address of the target BUAP(s), the network address of the UPF(s) acting as the target BUAP(s) or identifier of tunnel connecting to the target BUAP(s). The source BUAP then sends the traffic to the target BUAP(s) according to the information.

In some embodiments, the network address resolution may not be needed. For example, if the traffic is Ethernet traffic, the BUAP UPF may simply sends the UL traffic to the target BUAP(s) using all the Nx interfaces associated with the BUAP UP.

After receiving the traffic, the target BUAP(s) may send the traffic using the UP tunnels associated to the BUAP(s) as DL traffic to the UE(s).

Figure 7:
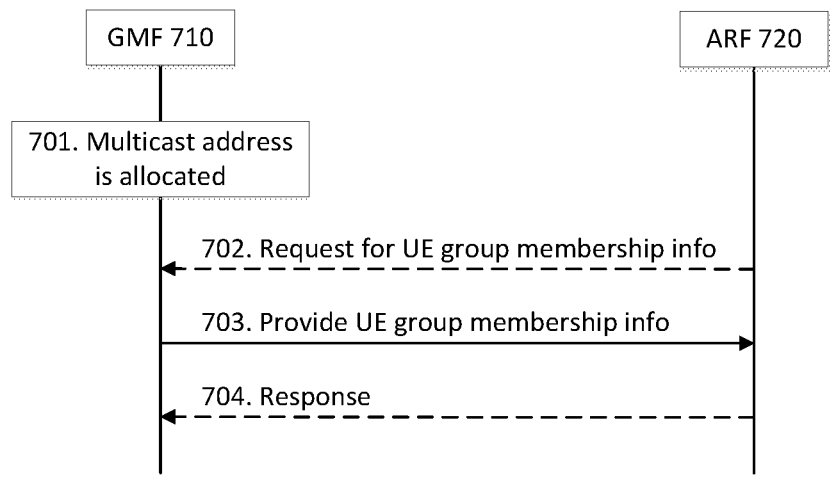
FIG. 7 is a flow diagram illustrating a procedure of registering multicast address in accordance with embodiments of the present invention.

FIG. 7 illustrates a procedure of registering multicast address in accordance with embodiments of the present invention. After the GMF allocates a multicast address to a LAN UE group (e.g. within step 304 of FIG. 3A) or receives a multicast address associated to a LAN UE group (e.g. within step 303 in FIG. 3A), the GMF may provide the information of the association between this multicast address and the LAN UE group to the ARF. The GMF may do this upon a request from the ARF (e.g. the ARF may send such a request to the GMF when it receives subscription for information of the BUAPs associated with the address in step 802 of FIG. 8) or spontaneously by itself (e.g. after the GMF performs step 304 of FIG. 3A).

At step 701, the GMF 710 allocates a multicast address to a LAN UE group (this can be performed within step 304 of FIG. 3A) or receives a multicast address associated to a LAN UE group (this can be performed within step 303 of FIG. 3A). Then, the GMF 710, at step 702, receives a request for LAN UE group membership information corresponding to the multicast address. The request may be sent from the ARF 720, for example when the ARF receives subscription for information of the BUAPs associated with the multicast address in step 802 of FIG. 8. Step 702 is optional.

At step 703, the GMF 710 identifies the LAN UE group corresponding to the network address and sends a message including the IDs of UEs within the LAN UE group to the ARF 720. The message sent to the ARF 720 may further include the multicast address and/or ID of the LAN UE group. Then, the ARF 720, at step 704, may optionally respond to the GMF 710, to acknowledge the receipt of the message.

While not illustrated in FIG. 7, the GMF 710 may be able to deregister multicast address that has been allocated to a LAN UE group from the ARF 340. Deregistration of multicast address may occur upon release of the multicast address. In some embodiments, the GMF 710 may release the multicast address (that has been allocated to a LAN UE group) upon the removal of the LAN UE group. In some embodiments, the GMF 710 may release the multicast address that has been allocated to a LAN UE group when the multicast address has not been used by UEs of the LAN UE group for a long time. Then, the GMF 710 may send a deregistration message including the multicast address and/or ID of the LAN UE group. Then, the ARF 720 removes the information of association between the multicast address and the LAN UE group, and the registered multicast address is deregistered. The ARF 720 may optionally respond to the GMF 710 to acknowledge the receipt of the message.

Figure 8:
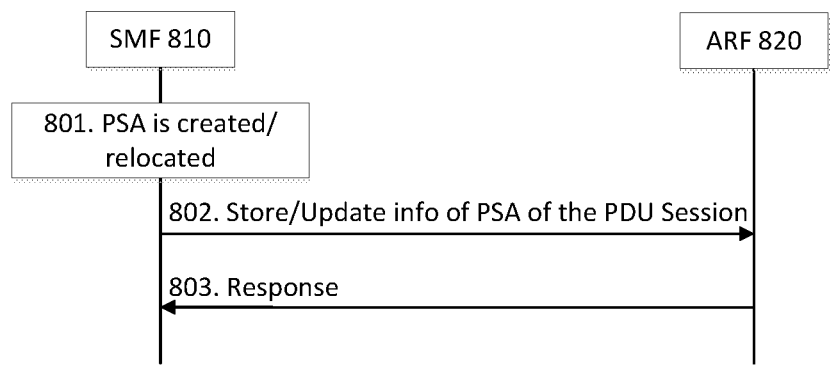
FIG. 8 is a flow diagram illustrating a procedure of registering PDU Session Anchor (PSA) information in accordance with embodiments of the present invention.

FIG. 8 illustrates a procedure of registering PSA information in accordance with embodiments of the present invention. When the PSA is created, relocated or release for a PDU Session, the SMF serving the PDU Session registers or deregisters with the ARF the information of the PSA for the network address allocated to the UE for the PDU Session. The registering may corresponds to storing or updating the information in the ARF; the deregistering may corresponds to removing the information in the ARF. The decision of creation or relocation of the PSA may be received by the SMF from the PMF via the procedure described above (e.g. FIG. 6 and the paragraphs illustrating FIG. 6).

Referring to FIG. 8, the SMF 810, at step 801, creates or relocates or releases the PSA of a PDU Session of a UE. This step may happen during establishment, modification or release of the PDU Session.

At step 802, the SMF 810 stores, updates or removes the information of the BUAP UPF (e.g. the UPF that plays a BUAP rule or implementing the BUAP functionality) acting as the PSA of the PDU Session in the ARF 820. The information may include the identifier (or the network address) of the BUAP UPF and the network address of the UE. When storing/updating the information, the SMF 810 may include the information in a message and send the message to the ARF 820. Upon receipt of the message, the ARF 820 stores or updates the information in the message in its local repository.

When removing the information, the SMF 810 may include the network address of the UE and possibly an indication of removal in a message and send the message to the ARF 820. The removal indication is optional if the message itself implies such removal. Upon receipt of the message, the ARF 820 identifies the entry in its local repository using the information in the message and deletes the entry from its local repository.

At step 803, the ARF 820 responds to the SMF 810 to acknowledge the receipt of the message.

According to embodiments, the message between the SMF 810 and the ARF 820 may further include the network address (e.g. IP address) allocated to the UE (and possibly identifier of the LAN UE group that the PDU Session is established for). The message may further include the UE ID.

Figure 9:
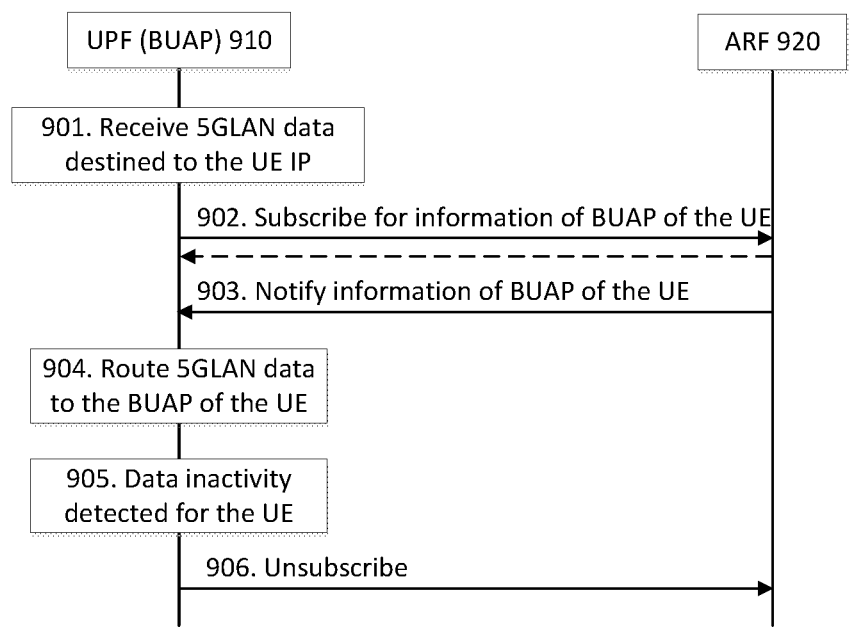
FIG. 9 is a flow diagram illustrating a procedure of how the User Plane Function (UPF) interacts with the Address Resolution Function (ARF) to identify PSA information of target UE in accordance with embodiments of the present invention.

FIG. 9 illustrates a procedure of how the UPF interact with the ARF to identify PSA information of target UE in accordance with embodiments of the present invention. Upon detection of traffic destined to the target UE, the PSA of the source UE queries the ARF for the information of BUAP/PSA associated to the target UE network address (i.e. address resolution). The source PSA may query the ARF directly. In some embodiments, the source PSA may query the ARF via the SMF (e.g. When the SMF is involved, the SMF may forward the query to the ARF or query the ARF on behalf of the source PSA). In some embodiments, the source PSA may query ARF via the PMF (e.g. The PMF may forward the query to the ARF or query the ARF on behalf of the source PSA). The ARF responds to the query with the information of BUAP/PSA of the target UE. The query may be sent to the PSA directly or indirectly (via the SMF or via the PMF), depending on how the query reaches the ARF. The query-response mechanism may work like subscription-notification mechanism. The query may take place only when the source PSA does not know how to route traffic; the response may take place as soon as the query is received and subsequently whenever the queried the information changes.

Referring to FIG. 9, the UPF (BUAP/PSA) 910, at step 901, receives from a UP tunnel data traffic destined to a network address, which may be a unicast address associated to a specific UE or a multicast address associated to a group of UEs. Here, the UPF 910 may be viewed as a BUAP UPF from the backbone UP point of view or a PSA UPF from the access UP point of view. The UPF 910 may use the information (e.g. tunnel identifier, information of tunnel end point (such as tunnel end point ID)) of the UP tunnel to identify the LAN UE group that the traffic is related to or belong to. The UP tunnel is part of the UP path of a PDU Session established for a UE to participate or join or perform communication within the LAN UE group. The LAN UE group is a LAN UE group that the UE belongs to. The mapping between the UP tunnel and the LAN UE group may be preconfigured in the UPF 910 by the SMF serving the PDU Session, e.g. in step 508 of FIG. 5.

At step 902, the UPF 910 subscribes/requests to receive or queries for information of the BUAP(s)/PSA(s) associated with the network address for the LAN UE group from the ARF 920. The UPF 910 performs the subscription/request by sending a message to the ARF 920. The message may include the network address retrieved from the data traffic in step 901. The message may further include information (e.g. group ID) of the LAN UE group identified in step 901. The message may further include the network address or ID of the UPF 910. The ARF 920 may respond to the UPF 910 by including the subscribed/requested/queried information in the response. Step 902 may be optional if the UPF 910 has already performed the subscription.

At step 903, whenever the subscribed/requested/queried information of the BUAP(s)/PSA(s) changes, the ARF 920 notifies the UPF 910 of the new information which may indicate the network address of the BUAP(s)/PSA(s) (which may be the network address of corresponding UPF(s)), IDs of the BUAP(s)/PSA(s) (which may be the ID of corresponding UPF(s)), information of tunnel(s) connecting the UPF to the BUAP(s)/PSA(s). Step 903 may take place immediately after the ARF 920 receives the subscription/request/query from the UPF 910 at step 902. In case that the ARF 920 receives the subscription/request/query from the UPF 910 at step 902, step 903 may act as a response to the UPF 910's subscription/request/query. The ARF 920's response to the UPF 910 in step 902 (e.g. shown as dashed line in FIG. 9) is optional.

Then, at step 904, using the information of the BUAP(s)/PSA(s) received in step 902 (shown as dashed line in FIG. 9) or step 903 (and possibly together with the LAN UE group ID identified in step 901), the UPF 910 identifies the respective Nx connection (which may be in the form of traffic routing rules) and performs the data traffic routing using the identified Nx connection to the BUAP(s)/PSA(s).

After receiving the data traffic destined to the network address from the Nx connection, each of these BUAP(s)/PSA(s) maps the network address to a UP tunnel and sends the data traffic using the UP tunnel. The mapping may require use of LAN UE group information (e.g. group ID). For example, the BUAP/PSA may identify the LAN UE group that the data traffic is related to (or belongs to) using information of the Nx connection (e.g. which Nx connection corresponds to which LAN UE group may be preconfigured by the PMF in step 603b or step 607b of FIG. 6). The BUAP/PSA may also use the LAN UE group information (e.g. LAN UE group ID) together with the network address to identify the UP tunnel.

The UP tunnel may be part of the UP path of a PDU Session established for communication within the LAN UE group. The mapping between the UP tunnel and the network address (or the mapping between the UP tunnel and the combination of the network address and the LAN UE group) may be preconfigured in the UPF 910 by the SMF serving the PDU Session during establishment/modification of the PDU Session when configuring the UP path, e.g. in step 508 of FIG. 5 in the case of PDU Session establishment.

At step 905, the UPF 910 detects that there is no data activity associated with the network address. For example, the UPF 910 may detect that traffic which is destined to the network address has not been observed/identified on the Nx connection within a pre-configured time window. If the network address is used by other LAN UE groups as well, the detection of no data activity is related to or corresponds to this particular UP group.

At step 906, the UPF 910 removes the entry of information of the BUAP(s)/PSA(s) associated to the network address from its local repository and unsubscribes from the ARF. The unsubscription can be done by sending a message to the ARF 920 indicating the unsubscription. The unsubscription message may include the network address (and possibly the LAN UE group ID as well). After receiving the unsubscription message, the ARF 920 stops notifying the UPF 910 of update of the information. If the network address is used by other LAN UE groups as well, the UPF 910 removes the entry of information of the BUAP(s)/PSA(s) associated to the network address for this LAN UE group.

Figure 10:
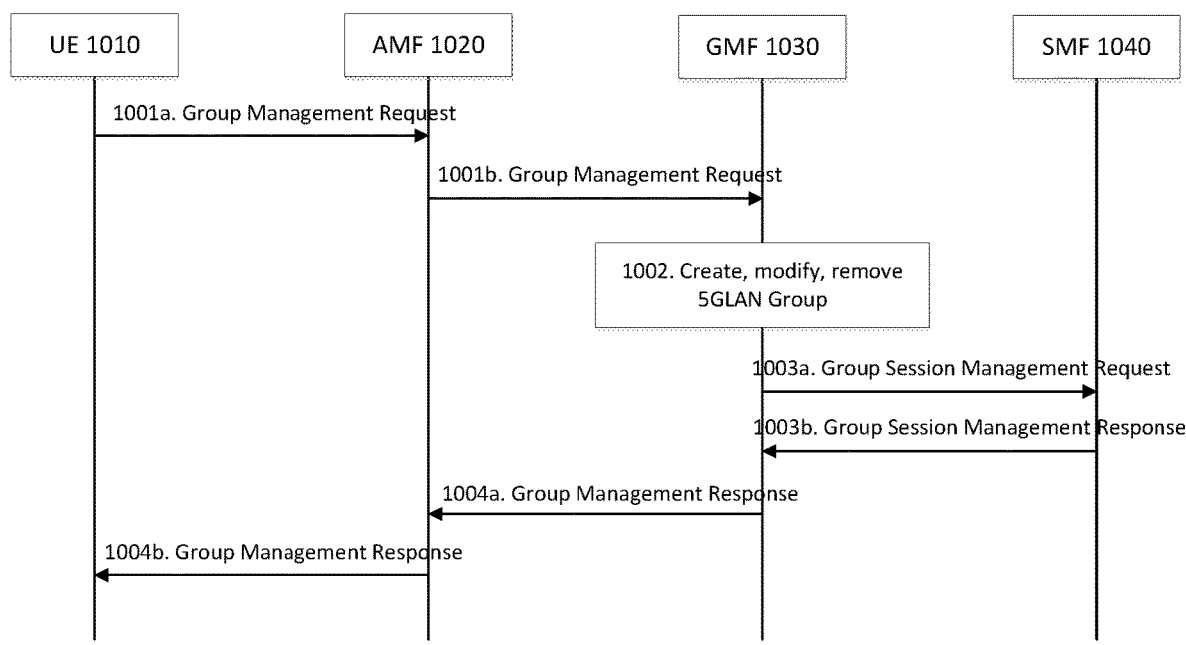
FIG. 10 is a flow diagram illustrating a procedure for LAN UE group management initiated by UE in accordance with embodiments of the present invention.

FIG. 10 illustrates a procedure for LAN UE group management initiated by a UE in accordance with embodiments of the present invention.

At step 1001*a*, the UE 1010 may send a group management request in a N1 NAS message to the AMF 1020 via the serving (R)AN. For simplicity, the (R)AN is not shown in FIG. 10. The N1 NAS message may include one or more of the following information:

request type of group Management (e.g. group establishment, group modification, group removal);
a list of UE ID (SUCI, SUPI or GPSI) and UE's Ethernet MAC address of UEs in the group;
LAN UE group Identifier (ID) of the parent LAN UE group;
LAN UE group ID of the LAN UE group if available; and network slice information if available (e.g. S-NSSAI).

Upon receipt of the message including group management request, the AMF 1020, at step 1001*b*, forwards the UE 1010's request to the GMF 1030. The AMF 1020 may also send any of the (R)AN type, (R)AT type and (R)AN address information (such as (R)AN ID, (R)AN IP address or (R)AN FQDN) to the GMF 1030.

Upon receipt of the group management request, the GMF 1030, at step 1002, creates, modifies or removes LAN UE group context (e.g. 5GLAN group context). If the UE 1010's request is for group establishment, the GMF 1030, at step 1002, creates LAN UE group context which may include one or more of following information:

LAN UE group ID (e.g. the ID that may be created by the GMF to represent the LAN UE group, the ID creation (which corresponds to creation of the LAN UE group) may be requested by the UE within the LAN UE group);
List of UE ID(s) and UE's Ethernet MAC address; and
IP Multicast or IP Broadcast address or IP prefix (e.g. the IP Address or IP prefix that the UE may use to send multicast or broadcast packets to other UEs in the same LAN UE group.

If the UE 1010's request is for group modification, the UE 1010 may have provided LAN UE group ID in step 1001*a*. Using the LAN UE group ID, the GMF 1030, at step 1002, updates the group information such as member UE of the LAN UE group.

If the UE 1010's request is for group removal, the GMF 1030, at step 1002, may delete the LAN UE group context.

At step 1003*a*, if the UE 1010 requests group establishment in step 1001*a* and an SMF is responsible of allocating IP address for multicast and broadcast data transmission, the GMF 1030 may select an SMF by using S-NSSAI and (R)AN information. The GMF 1030 may request NRF (Network Repository Function) in order to select an SMF by providing S-NSSAI, (R)AN information, UE IDs of LAN UE group to the NRF. The GMF may send group Session Management Request to the selected SMF (e.g. the SMF 1040 in FIG. 10). The message may include the list of UE IDs, request type of group management (e.g. group establishment, group modification, group removal), LAN UE group ID.

If the UE 1010 requests group removal in step 1001*a*, the GMF 1030 may request the SMF 1040 to release the LAN UE group information.

At step 1003*b*, if the UE 1010 requested to establish LAN UE group, the SMF 1040 may allocate IP address(es) or IP prefix(es) to the LAN UE group for multicast or broadcast data transmission between UEs in the LAN UE group. Then, the SMF 1040 may send a group session management response to the GMF 1030. The response may include the allocated IP address(es) or IP prefix(es) and will be sent to the GMF 1030. The SMF 1040 may also create a LAN UE group context, which may include the LAN UE group ID, UE IDs of LAN UE group, allocated IP address(es) of IP prefix(es).

At step 1003*b*, if the UE 1010 requested to remove a LAN UE group in step 1001*a*, the SMF 1040 may release the allocated IP address(es) or IP prefix(es) that has been allocated to the LAN UE group.

At steps 1004*a* and 1004*b*, the GMF 1030 may send group management response to the UE 1010 via the AMF 1020. At step 1004*a*, the GMF 1030 may send group management response to the AMF 1020. The message may include one or more of the allocated LAN UE group ID, IP address(es) or IP prefix(es) for the multicast/broadcast data transmission, and the expired time of the LAN UE group. At step 1004*b*, the AMF 1020 forwards the group management response received from the GMF 1030 to the UE 1010.

Figure 11:
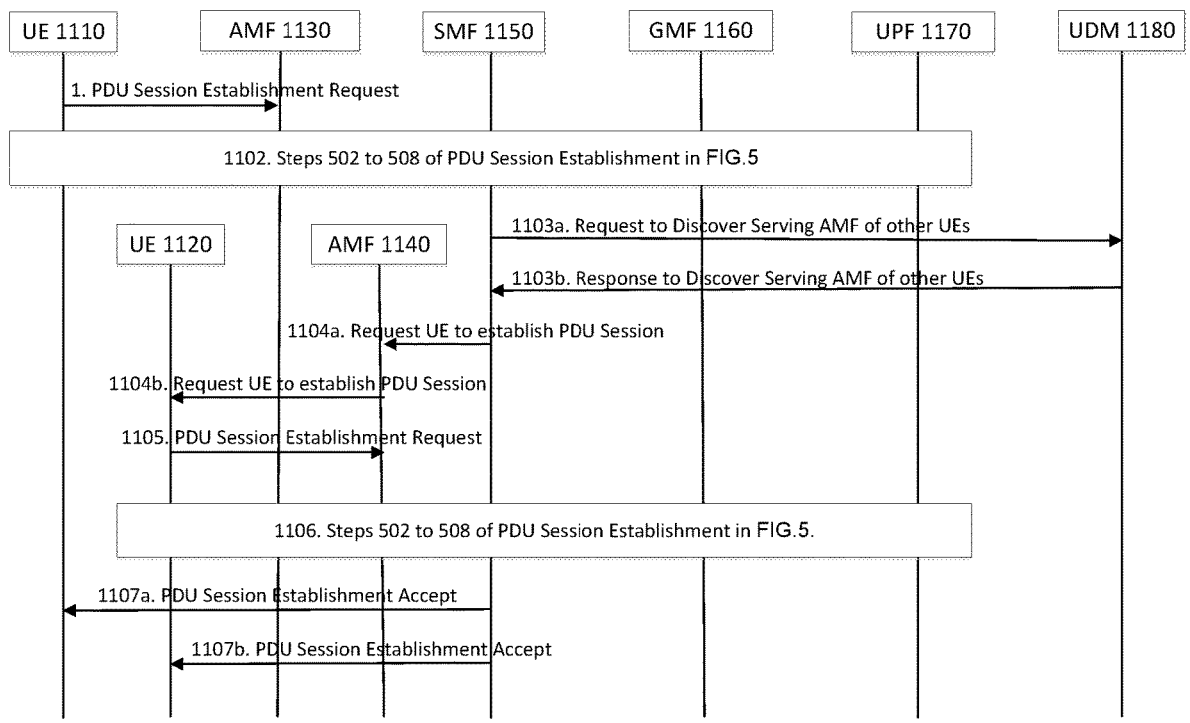
FIG. 11 is a flow diagram illustrating a procedure of UE-originated Multicast or Broadcast (MB) data transmission in accordance with embodiments of the present invention.

FIG. 11 illustrates a procedure of UE-originated multicast or broadcast (MB) data transmission. In the procedure illustrated in FIG. 11, the UE 1110 sends packets and/or files to multiple other UEs (e.g. the UE 1120). Here, the UE 1110 and the UE 1120 are served by the AMF 1130 and the AMF 1140, respectively.

Referring to FIG. 11, at step 1101, The UE 1110 may send a PDU Session Establishment request to the serving AMF 1130. The request message may include one or more of the following information: indication of LAN UE group ID, indication to establish a multicast or a broadcast session, type of resources (GBR or non-GBR).

According to embodiments, in case of multicast session, the UE 1110's request message may include the LAN UE group ID to represent the LAN UE group, which has been received from the procedure for UE-initiated group Management illustrated above (FIG. 10). In case of broadcast session, the UE 1110's request message may not include LAN UE group ID, but it may indicate the request for establishment of broadcast session to allow data transmission to all the UEs in the internal group.

At step 1102, the CN functions, including the AMF 1130, the SMF 1150, the GMF 1160, establish a MB Session that provides UP connection from UE 1110 to a MB Session Anchor (MBSA) UPF (e.g. the UPF 1170). The SMF 1160 may generate a LAN MB Session ID for the MB Session. Then, the SMF 1160 maps the UE-generated PDU Session ID to the LAN MB Session ID. The SMF 1160 may also notify other CN functions, such as AMFs (e.g. AMF-1130 and AMF 1140), PCF, UDM (e.g. UDM 1180), of the LAN MB Session ID. Step 1102 is similar to steps 502 to 508 of PDU Session Establishment in FIG. 5.

At step 1103*a*, the SMF 1150 may send a request to discover the serving AMF of other UEs (e.g. AMF 1140). Here in FIG. 11, other UEs are represented by the UE 1120. The SMF 1150's request message may be implemented by using Nudm_UECM_Get service of the UDM function as specified in the 3GPP TS 23.502, clause 5.2.3.2.4, version 15.2.0.

At step 1103*b*, the UDM 1180 may send a response to the SMF 1150, for example by using Nudm_UECM_Get response message as specified in the 3GPP TS 23.502, clause 5.2.3.2.4, version 15.2.0, and notify the SMF 1150 of the AMF 1140 (e.g. the AMF that serves the UE 1120).

At step 1104*a*, the SMF 1150 may send a request towards the UE 1120 to establish MB session via the AMF 1140. This SMF 1150's request message may carry an indication that the UE 1120 requests PDU Session for the multicast or for broadcast session. The request message may further include the LAN MB Session ID. Then, at step 1104*b*, the AMF 1140 forwards the request message received from the SMF 1150 at step 1104*a* to the UE 1120.

At step 1105, the UE 1120 may send PUD Session establishment request to the AMF 1140. The request message may include the LAN MB Session ID so that the AMF 1140 knows that the same SMF (e.g. SMF 1150) will be selected to serve the PDU Session.

At step 1106, the AMF 1140 may use LAN MB Session ID to relate the PDU Session request from the UE 1120 and the MB Session. The CN functions, including AMF 1140, SMF 1150, GMF 1160, may establish a PDU Session that provides UP connection from UE 1120 to the MB Session Anchor (MBSA) UPF (e.g. the UPF 1170). Step 1106 is similar to steps 502 to 508 of PDU Session establishment in FIG. 5.

After establishing the MB Session, the SMF 1150 sends acceptance of the PDU Session establishment to the UE 1110 in step 1107*a* and to the UE 1120 in step 1107*b*. Either of step 1107*a* or after step 1107*b* can performed first. The UE 1101 may send a UL packet to other UEs.

In another embodiment, the multicast or broadcast data transmission from one UE to some other UEs may be implemented by using a default QoS flow of an existing PDU Session. For example, referring to FIG. 5, during the PDU Session Establishment procedure, a default QoS may be established together with the QoS flow(s) that requested by the UE 510. The default QoS flow has a default QoS rule. The SMF 530 may assign one or more IP Addresses, or one or more IP Prefixes, for the UE 510 to use for sending UL multicast or broadcast data to the UEs of UE group.

The SMF may select a UPF to serve as MBSA UPF.

The SMF 530 may insert a Uplink Classifier UPF (UL CL) UPF to the user plane of the PDU Session of the UE 510 such that the UL CL UPF may forward multicast or broadcast packets sent on the default QoS flow of PDU Session of UE 510 to other UPF 550 that serve other UEs. Alternatively, the UL CL UPF may forward multicast or broadcast packets sent on the default QoS flow of PDU Session of UE 510 to the MBSA UPF. The MBSA may distribute the MB packets to other UL CL UPF of PDU Session of other UEs. The UL CL UPF of PDU Session of other UEs will forward the MB packets to the downlink tunnel towards other UEs of the UE multicast or broadcast UE group.

The SMF may establish a user plane interface, such as N9 interface, for uplink and downlink to connect the UL CL UPF of PDU Session of UE 510 and the MBSA UPF. When the UE 510 sends a uplink MB packet, the UL CL UPF may forward this packet to the MBSA UPF. The MBSA UPF may send this packet to all the downlink N9 interface towards each of UL CL UPF(s) of the other UEs of UE multicast or broadcast group. The UL CL UPF of other UE may forward the MB packet toward other UE.

Figure 12:
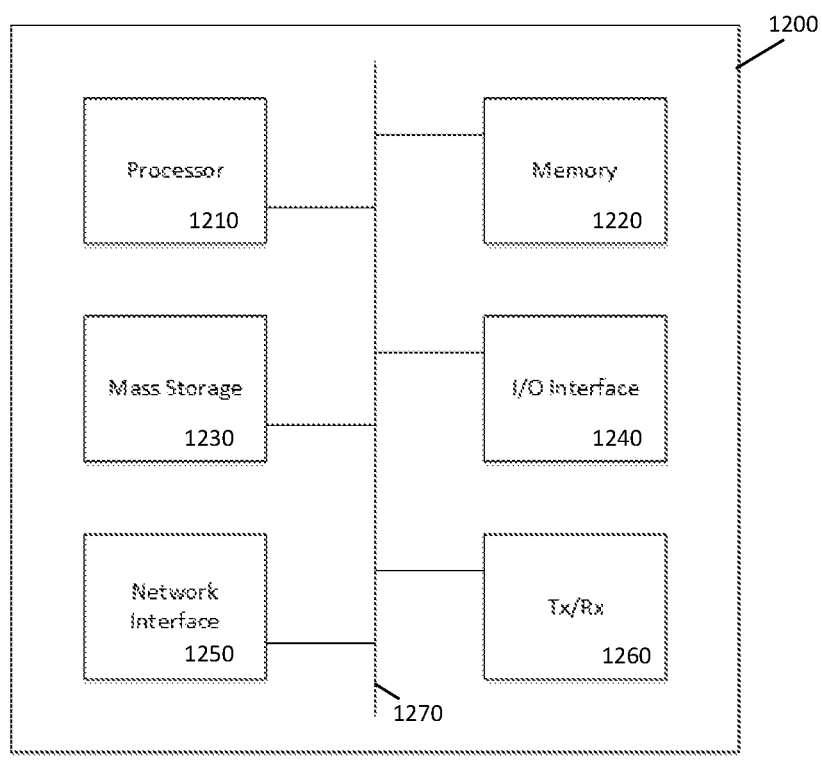
FIG. 12 is a schematic diagram of an electronic device, accordance with embodiments of the present invention.

FIG. 12 is a schematic diagram of an electronic device 1200 that may perform any or all of steps of the above methods and features described herein, according to different embodiments of the present invention. For example, a UE may be configured as electronic device. Further, a network element hosting any of the network functions described herein (e.g., the GMF, PMF, ARF, etc.) may be configured as the electronic device 1200.

As shown, the device includes a processor 1210, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

An aspect of the disclosure provides a method for enabling group user equipment (UE) communication, the method performed by a session management function (SMF) of a core network. The method includes receiving a request for a protocol data unit (PDU) session. The method further includes the SMF requesting authorization and authentication from a data network (DN) authentication, authorization, and accounting (AAA) server. The method further includes the SMF receiving information associated with an allowed UE group from the DN-AAA server. The method further includes the SMF requesting PCC rules for the PDU session, the request including information about the PDU session, including the information associated with the allowed UE group. The method further includes the SMF receiving the PCC rules associated with the allowed UE group; and establishing the user plane path for the PDU session according to the PCC rules. In some embodiments requesting the PCC rules includes sending the request to a policy control function (PCF). In some such embodiments, receiving the PCC rules includes receiving the rules receiving the rules from the PCF. In some embodiments establishing the user plane path for the PDU session according to the PCC rules includes configuring a user plane path selected by a path management function (PMF). In some such embodiments, configuring a user plane path selected by a PMF includes: subscribing to a notification of user plane path selection from the PMF; receiving the notification of a user plane path selection from the PMF; and configuring the user plane path using the UPFs identified in the notification. In some embodiments the information associated with the allowed UE group includes a UE group ID. In some embodiments the method further includes sending information to a radio access network (RAN) node indicating that the PDU session supports one of multicast and broadcast communication. In some such embodiments, sending information to a RAN node comprises sending the UE group ID. In some embodiments, the method further includes sending a message towards the UE indicating the PDU Session establishment request is accepted. In some such embodiments, sending a message towards the UE includes sending security credentials received from the DN-AAA server.

Another aspect of the disclosure provides a network node configured as a session management function. The SMF includes a processor coupled to non-transient machine readable memory for configuring the network node for: receiving a request for a protocol data unit (PDU) session; requesting authorization and authentication from a data network (DN) authentication, authorization, and accounting (AAA) server; receiving information associated with an allowed UE group from the DN-AAA server; requesting PCC rules for the PDU session, the request including information about the PDU session, including the information associated with the allowed UE group; receiving the PCC rules associated with the allowed UE group; and establishing the user plane path for the PDU session according to the PCC rules. In some embodiments, the SMF is further configured for: requesting the PCC rules from a policy control function (PCF); and receiving the PCC rules from the PCF. In some such embodiments, the SMF being configured for establishing the user plane path for the PDU session according to the PCC rules includes the SMF being configured for configuring a user plane path selected by a path management function (PMF). In some embodiments, the information associated with the allowed UE group includes a UE group ID. In some embodiments, the SMF is further configured for sending information to a radio access network (RAN) node indicating that the PDU session supports one of multicast and broadcast communication, wherein the information includes the UE group ID.

Another aspect of the disclosure provides a system for supporting user equipment (UE) group communication. Such a system includes a session management function; a data network (DN) authentication, authorization, and accounting (AAA) server; and a policy control function (PCF). In such a system, the SMF is configured for: receiving a request for a protocol data unit (PDU) session; requesting authorization and authentication from the DN AAA server; receiving information associated with an allowed UE group from the DN-AAA server; requesting PCC rules for the PDU session, the request including information about the PDU session, including the information associated with the allowed UE group; receiving the PCC rules associated with the allowed UE group; and establishing the user plane path for the PDU session according to the PCC rules. In such a system, the DN-AAA server is configured for sending the allowed UE group to the SMF in response to the request for authorization and authentication. In such a system, the PCF is configured for sending the PCC rules associated with the allowed UE group in response to the request for the PCC rules. In some embodiments, the system further includes a path management function configured for selecting a user plane path for the UE group and notifying the SMF of the user plane path. In some embodiments, the information associated with the allowed UE group includes a UE group ID. In some embodiments, the PDU session supports one of multicast and broadcast communication. In some such embodiments, the DN AAA server is configured to reply to the SMF with security credentials as part of the information associated with an allowed UE group.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method for enabling group user equipment (UE) communication, the method performed by a session management function (SMF) of a core network, the method comprising:
receiving a request for a protocol data unit (PDU) session;
requesting authorization and authentication from a data network (DN) authentication, authorization, and accounting (AAA) server;
receiving information associated with an allowed UE group from the Data Network Authentication, Authorization, And Accounting (DN-AAA) server, the information associated with the allowed UE group includes a UE group identifier (ID);
requesting Policy and Charging Control (PCC) rules for the PDU session, the request including information about the PDU session, including the information associated with the allowed UE group;
receiving the PCC rules associated with the allowed UE group; and
establishing the user plane path for the PDU session according to the PCC rules;
wherein
establishing the user plane path for the PDU session according to the PCC rules comprises configuring a user plane path selected by a path management function (PMF).

2. The method of claim 1 wherein requesting the PCC rules comprises sending the request to a policy control function (PCF).

3. The method of claim 2 wherein receiving the PCC rules comprises receiving the rules receiving the rules from the PCF.

4. The method of claim 1, wherein configuring a user plane path selected by a PMF comprises:
subscribing to a notification of user plane path selection from the PMF;
receiving the notification of a user plane path selection from the PMF; and
configuring the user plane path using the User Plane Functions (UPF)s identified in the notification.

5. The method of claim 1 further comprising sending information to a radio access network (RAN) node indicating that the PDU session supports one of multicast and broadcast communication.

6. The method of claim 5 wherein sending information to a RAN node comprises sending the UE group ID.

7. The method of claim 1 further comprising sending a message towards the UE indicating the PDU Session establishment request is accepted.

8. The method of claim 7 wherein sending a message towards the UE includes sending security credentials received from the DN-AAA server.

9. A network node configured as a session management function comprising:
a processor coupled to non-transient machine readable memory for configuring the network node for:
receiving a request for a protocol data unit (PDU) session;
requesting authorization and authentication from a data network (DN) authentication, authorization, and accounting (AAA) server;
receiving information associated with an allowed UE group from the DN-AAA server, the information associated with the allowed UE group includes a UE group ID;
requesting PCC rules for the PDU session, the request including information about the PDU session, including the information associated with the allowed UE group;
receiving the PCC rules associated with the allowed UE group; and
establishing the user plane path for the PDU session according to the PCC rules, wherein the SMF being configured for establishing the user plane path for the PDU session according to the PCC rules comprises the SMF being configured for configuring a user plane path selected by a path management function (PMF).

10. The network node as claimed in claim 9 wherein the SMF is further configured for:
requesting the PCC rules from a policy control function (PCF); and
receiving the PCC rules from the PCF.

11. The network node as claimed in claim 9 wherein the SMF is further configured for sending information to a radio access network (RAN) node indicating that the PDU session supports one of multicast and broadcast communication, wherein the information includes the UE group ID.

12. A system for supporting user equipment (UE) group communication comprising:
a session management function (SMF) comprising a processor and a machine readable memory storing machine readable instructions;
a data network (DN) authentication, authorization, and accounting (AAA) server;
and a policy control function (PCF):
wherein the machine readable instructions, when executed by the processor, configure the SMF for:
receiving a request for a protocol data unit (PDU) session;
requesting authorization and authentication from the DN-AAA server;
receiving information associated with an allowed UE group from the DN-AAA server, the information associated with the allowed UE group includes a UE group ID;
requesting PCC rules for the PDU session, the request including information about the PDU session, including the information associated with the allowed UE group;
receiving the PCC rules associated with the allowed UE group; and
establishing the user plane path for the PDU session according to the PCC rules;
wherein the DN-AAA server is configured for sending the allowed UE group to the SMF in response to the request for authorization and authentication; and
wherein the PCF is configured for sending the PCC rules associated with the allowed UE group in response to the request for the PCC rules,
the system further comprising a path management function configured for selecting a user plane path for the UE group and notifying the SMF of the user plane path.

13. The system as claimed in claim 12 wherein the PDU session supports one of multicast and broadcast communication.

14. The system as claimed in claim 12 wherein the DN AAA server is configured to reply to the SMF with security credentials as part of the information associated with an allowed UE group.

15. The method of claim 1 wherein the allowed UE group includes a Local Area Network (LAN) UE group.

16. The network node as claimed in claim 9 wherein the allowed UE group includes a Local Area Network (LAN) UE group.

17. The system as claimed in claim 12 wherein the allowed UE group includes a Local Area Network (LAN) UE group.

* * * * *